US012430507B2

(12) United States Patent
Parrish et al.

(10) Patent No.: US 12,430,507 B2
(45) Date of Patent: Sep. 30, 2025

(54) ARTIFICIAL INTELLIGENCE-BASED ENGINEERING REQUIREMENTS ANALYSIS

(71) Applicant: The MITRE Coporation, McLean, VA (US)

(72) Inventors: Brian Parrish, Smithville, MO (US); Adam Zakaria, Cambridge, MA (US); Xuan Chau, Lexington, MA (US); David McCreight, Vienna, VA (US); Connor Smedley, Colorado Springs, CO (US); Paul Butler, New Smyrna Beach, FL (US); Pete Carlisle, Orlando, FL (US)

(73) Assignee: The MITRE Corporation, McLean, VA (US)

( * ) Notice: Subject to any disclaimer, the term of this patent is extended or adjusted under 35 U.S.C. 154(b) by 426 days.

(21) Appl. No.: 17/824,979

(22) Filed: May 26, 2022

(65) Prior Publication Data

US 2022/0382977 A1    Dec. 1, 2022

Related U.S. Application Data

(60) Provisional application No. 63/193,484, filed on May 26, 2021.

(51) Int. Cl.
*G06F 40/279* (2020.01)
*G06F 3/0482* (2013.01)
*G06F 16/334* (2025.01)
*G06F 16/34* (2025.01)
*G06N 5/022* (2023.01)

(52) U.S. Cl.
CPC .......... *G06F 40/279* (2020.01); *G06F 3/0482* (2013.01); *G06F 16/3344* (2019.01); *G06F 16/345* (2019.01); *G06N 5/022* (2013.01)

(58) Field of Classification Search
CPC .. G06F 40/279; G06F 3/0482; G06F 16/3344; G06F 16/345; G06F 3/0481; G06F 40/284; G06F 40/216; G06N 5/022; G06N 20/00
USPC .............................................. 704/9; 715/277
See application file for complete search history.

(56) References Cited

U.S. PATENT DOCUMENTS

| 5,930,762 | A   | * | 7/1999 | Masch ................... G06Q 10/06 705/7.36 |
| 10,788,976 | B2 | * | 9/2020 | Chaudhri ................. H04N 7/15 |
| 11,275,794 | B1 | * | 3/2022 | Rajpara ............... G06F 16/3344 |
| 2012/0011428 | A1 | * | 1/2012 | Chisholm ............. G06F 40/169 715/230 |

(Continued)

OTHER PUBLICATIONS

Soares et al. "Model-Driven User Requirements Specification using SysML" (Year: 2008).*

*Primary Examiner* — Davetta W Goins
*Assistant Examiner* — Fouzia Hye Solaiman
(74) *Attorney, Agent, or Firm* — Morrison & Foerster LLP

(57) ABSTRACT

Methods and systems are described that use artificial intelligence (AI)-based natural language processing (NLP) techniques to rapidly analyze, merge, and/or identify relationships between systems engineering artifacts (e.g., system requirements, system architecture descriptions, research requirements, risk assessments, etc.) to accelerate systems engineering program management, technical capability development, and acquisition initiatives associated with systems engineering projects.

25 Claims, 13 Drawing Sheets

(56) References Cited

U.S. PATENT DOCUMENTS

| | | | |
|---|---|---|---|
| 2020/0034429 A1* | 1/2020 | Shukla | G06N 3/08 |
| 2020/0301950 A1* | 9/2020 | Lorrain-Hale | G06F 40/117 |
| 2020/0334520 A1* | 10/2020 | Chen | G06F 40/20 |
| 2020/0394333 A1* | 12/2020 | Norgeot | G06F 40/284 |
| 2021/0004432 A1* | 1/2021 | Li | G06F 40/295 |
| 2021/0042110 A1* | 2/2021 | Basyrov | G06F 40/295 |
| 2021/0042368 A1* | 2/2021 | Liu | G06F 16/955 |
| 2022/0188661 A1* | 6/2022 | Tappin | G06F 16/248 |
| 2022/0253290 A1* | 8/2022 | Nguyen | G06F 8/34 |

\* cited by examiner

ARTIFICIAL INTELLIGENCE-BASED ENGINEERING REQUIREMENTS ANALYSIS

CROSS-REFERENCE TO RELATED APPLICATIONS

This application claims the priority benefit of U.S. Provisional Patent Application Ser. No. 63/193,484, filed on May 26, 2021, the contents of which are incorporated herein by reference in their entirety.

STATEMENT REGARDING FEDERALLY SPONSORED RESEARCH OR DEVELOPMENT

This invention was made with government support under contract numbers W56KGU-18-D-0004 and W56KGU-20-F-0009 awarded by the U.S. Department of Defense. The government has certain rights in the invention.

BACKGROUND

Traditional systems engineering is a linear process where system requirements and the relationships between requirement documents and other engineering artifacts (i.e., the complete set of documentation associated with a software or system development project) are derived from source content (e.g., customer requirements) and used to develop and manage the project over its entire lifecycle. Extracting system requirements and establishing relationships (e.g., traceability and dependencies) between the various engineering documents associated with an engineering project is a manual process, requiring technical domain experts to perform key word searches one search at a time. Changes to upstream documents may require the reevaluation of impacted relationships. Changes to downstream documents may also require the reevaluation of relationships. System requirements determination and analysis, and the evaluation of relationships between the system requirements and other project documents, are thus laborious processes that have significant impact on project timelines and cost.

BRIEF SUMMARY OF THE INVENTION

Methods and systems are described that use artificial intelligence (AI)-based natural language processing (NLP) techniques to rapidly analyze, merge, and/or identify relationships between systems engineering artifacts (e.g., system requirements, system architecture descriptions, research requirements, risk assessments, etc.) to facilitate systems engineering program and project management, accelerate technical capability development, and prioritize acquisition initiatives associated with systems engineering projects. The disclosed methods and systems may be integrated with other systems engineering tools to improve management situational awareness and accelerate decision-making. The disclosed methods and systems also facilitate improvements in the quality of system requirements documentation by applying International Council on Systems Engineering (INCOSE) and Institute of Electrical and Electronics Engineers (IEEE) best practices that enable program managers to address issues in the engineering process quickly and efficiently, thereby radically reducing costs caused by, for example, changes to system requirements post-design. In some instances, the disclosed methods may be implemented as a containerized web application running on a cloud computing platform.

Disclosed herein are computer-implemented methods for automated analysis of engineering requirements comprising: displaying, within a first region of a graphical user interface on an electronic display device, a first list of engineering documents uploaded by a user, wherein the first list comprises one or more engineering requirement documents; displaying, within a second region of the graphical user interface on the electronic display device, a second list of one or more engineering documents uploaded by the user; receiving, using one or more processors, a first input from the user indicating a selection of one or more engineering requirement documents from the first list; processing the one or more selected engineering requirement documents from the first list using one or more artificial intelligence (AI)-based natural language processing algorithms to identify a set of one or more key terms; processing the engineering documents of the second list using the one or more artificial intelligence (AI)-based natural language processing algorithms to identify text corresponding to the one or more key terms; and indicating, in the display of the second list of engineering documents within the second region, those engineering documents of the second list that include text corresponding to the one or more key terms.

In some embodiments, the method further comprises determining, using the one or more natural language processing algorithms, a relationship between the one or more engineering requirement documents selected from the first list and those engineering documents of the second list that include text corresponding to the one or more key terms. In some embodiments, the relationship comprises a priority, a dependency, a causal constraint, a resource constraint, or a discretionary constraint.

In some embodiments, the method further comprises using a graphical indicator to indicate the one or more engineering requirement documents selected from the first list in the first region of the graphical user interface. In some embodiments, the graphical indicator comprises highlighting the one or more selected engineering requirement documents. In some embodiments, the method further comprises using a graphical indicator to indicate those engineering documents of the second list that include text corresponding to the one or more key terms in the second region of the graphical user interface. In some embodiments, the graphical indicator comprises highlighting the engineering documents of the second list that include text corresponding to the one or more key terms. In some embodiments, the graphical indicator is different depending on a relationship between the one or more engineering requirement documents of the first list and the engineering documents of the second list that include text corresponding to the one or more key terms. In some embodiments, the engineering documents of the second list comprise system or software requirement documents, system or software specification documents, system or software design documents, system or software architecture documents, system or software research requirements, system or software data model documents, system or software risk factor documents, system or software test case documents, system or software quality requirements, or any combination thereof.

In some embodiments, the graphical user interface is configured to allow the user to exchange documents and data with a commercial systems engineering software package. In some embodiments, the commercial systems engineering software package comprises the IBM Doors software package, the Atlassian JIRA software package, the No Magic MagicDraw software package, the Innoslate software package, or any combination thereof.

In some embodiments, the method further comprises outputting an updated engineering requirements document that summarizes text extracted from the engineering documents of the second list that corresponds to the one or more key terms. In some embodiments, the updated engineering requirements document complies with a professionally-recognized standard for engineering requirement documents. In some embodiments, the professionally-recognized standard for engineering requirement documents comprises an International Council on Systems Engineering (INCOSE) standard or an Institute of Electrical and Electronics Engineers (IEEE) standard.

In some embodiments, the one or more artificial intelligence (AI)-based natural language processing algorithms comprise a Support Vector Machine (SVM) algorithm, a Bayesian Network algorithm, a Maximum Entropy algorithm, a Conditional Random Field algorithm, a Neural Network or Deep Learning algorithm, a Bidirectional Encoder Representations from Transformers (BERT) algorithm, a Term Frequency-Inverse Document Frequency (TF-IDF) algorithm, or any combination thereof.

In some embodiments, the one or more artificial intelligent (AI)-based natural language processing algorithms may be trained on training data comprising domain-specific vocabulary and acronyms. In some embodiments, the graphical user interface comprises one or more text entry regions with which a user may enter and define domain-specific vocabulary words and acronyms. In some embodiments, the user may enter and define domain-specific vocabulary words and acronyms in common English. In some embodiments, the user-entered and defined domain-specific vocabulary words and acronyms are used to update a training data set used to train the one or more artificial intelligence (AI)-based natural language processing algorithms. In some embodiments, the graphical user interface allows users to create, add to, or edit predefined or custom domain-specific dictionaries containing domain-specific vocabulary words and acronyms, and their definitions. In some embodiments, the domain-specific dictionaries may be reused by users for subsequent analyses of engineering requirements documents. In some embodiments, the graphical user interface is configured to allow users to manually identify relationships between semantically-similar acronyms, words, and/or phrases to facilitate the analysis provided by the one or more natural language processing algorithms.

Also disclosed herein are computer-implemented methods for automated analysis of engineering requirements comprising: receiving a first set of one or more engineering documents comprising one or more engineering requirement documents; receiving a second set of one or more engineering documents; receiving a first input from a user indicating a selection of one or more engineering requirement documents from the first set; processing the one or more selected engineering requirement documents using one or more processors configured to run one or more artificial intelligence (AI)-based natural language processing algorithms to identify a set of one or more key terms; processing the engineering documents of the second list using the one or more artificial intelligence (AI)-based natural language processing algorithms to identify text corresponding to the one or more key terms; identifying those engineering documents of the second set that include text corresponding to the one or more key terms; and determining, using the one or more natural language processing algorithms, a relationship between the one or more engineering requirement documents selected from the first set and those engineering documents of the second set that include text corresponding to the one or more key terms.

In some embodiments, the relationship comprises a priority, a dependency, a causal constraint, a resource constraint, or a discretionary constraint. In some embodiments, the engineering documents of the second list comprise system or software requirement documents, system or software specification documents, system or software design documents, system or software architecture documents, system or software research requirements, system or software data model documents, system or software risk factor documents, system or software test case documents, system or software quality requirements, or any combination thereof. In some embodiments, the method further comprises outputting an updated engineering requirements document that summarizes text extracted from the engineering documents of the second list that corresponds to the one or more key terms. In some embodiments, the updated engineering requirements document complies with a professionally-recognized standard for engineering requirement documents. In some embodiments, the professionally-recognized standard for engineering requirement documents comprises an International Council on Systems Engineering (INCOSE) standard or an Institute of Electrical and Electronics Engineers (IEEE) standard. In some embodiments, the one or more artificial intelligence (AI)-based natural language processing algorithms comprise a Support Vector Machine (SVM) algorithm, a Bayesian Network algorithm, a Maximum Entropy algorithm, a Conditional Random Field algorithm, a Neural Network or Deep Learning algorithm, a Bidirectional Encoder Representations from Transformers (BERT) algorithm, a Term Frequency-Inverse Document Frequency (TF-IDF) algorithm, or any combination thereof. In some embodiments, the computer-implemented method is packaged as a containerized web application.

Also disclosed herein are systems for performing automated analysis of engineering requirements comprising: a display; one or more input devices; one or more processors; a memory device comprising a set of stored instructions which, when executed by the one or more processors, cause the system to perform any of the methods described herein.

Also disclosed herein are non-transitory computer-readable storage medium storing one or more programs, the one or more programs comprising instructions which, when executed by one or more processors of an electronic device or system, cause the electronic device or system to perform any of the methods described herein.

INCORPORATION BY REFERENCE

All publications, patents, and patent applications mentioned in this specification are herein incorporated by reference in their entirety to the same extent as if each individual publication, patent, or patent application was specifically and individually indicated to be incorporated by reference in its entirety. In the event of a conflict between a term herein and a term in an incorporated reference, the term herein controls.

BRIEF DESCRIPTION OF THE DRAWINGS

Various aspects of the disclosed methods, devices, and systems are set forth with particularity in the appended claims. A better understanding of the features and advantages of the disclosed methods, devices, and systems will be obtained by reference to the following detailed description of illustrative embodiments and the accompanying drawings, of which:

DETAILED DESCRIPTION

Figure 1:
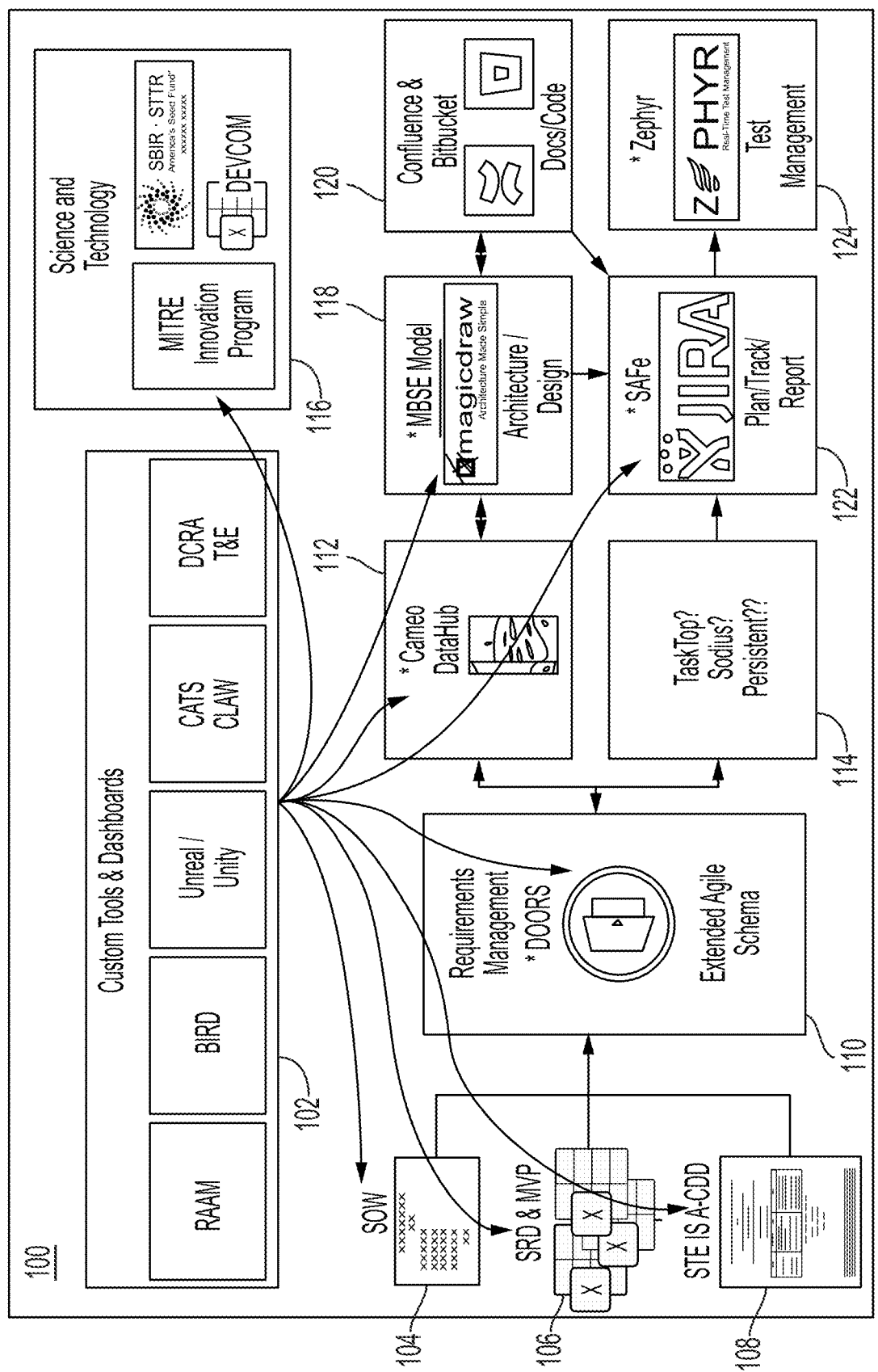
FIG. 1 provides a non-limiting schematic illustration of a digital engineering environment platform (DEEP) as described herein.

Methods and systems are described that use artificial intelligence (AI)-based natural language processing (NLP) techniques to rapidly analyze, merge, and/or identify relationships between systems engineering artifacts (e.g., system requirements, system architecture descriptions, research requirements, risk assessments, etc.) to facilitate systems engineering program and project management, accelerate technical capability development, and prioritize acquisition initiatives associated with systems engineering projects. The disclosed methods and systems may be integrated with other systems engineering tools to improve management situational awareness and accelerate decision-making. The disclosed methods and systems also facilitate improvements in the quality of system requirements documentation by applying INCOSE and IEEE best practices that enable program managers to address issues in the engineering process quickly and efficiently, thereby radically reducing costs caused by, for example, changes to system requirements post-design. In some instances, the disclosed methods may be implemented as a containerized web application running on a cloud computing platform.

The disclosed methods and systems comprise both a front-end graphical user interface (GUI) that allows users to access the engineering requirements analysis functionality provided, and also a back-end electronic document processing engine that provides the artificial intelligence-based natural language processing capabilities that underlie the engineering requirements analysis functionality.

In some instances, for example, disclosed herein are computer-implemented methods for automated analysis of engineering requirements comprising: displaying, within a first region of a graphical user interface on an electronic display device, a first list of engineering documents uploaded by a user, wherein the first list comprises one or more engineering requirement documents; displaying, within a second region of the graphical user interface on the electronic display device, a second list of one or more engineering documents uploaded by the user; receiving, using one or more processors, a first input from the user indicating a selection of one or more engineering requirement documents from the first list; processing the one or more selected engineering requirement documents from the first list using one or more artificial intelligence (AI)-based natural language processing algorithms to identify a set of one or more key terms; processing the engineering documents of the second list using the one or more artificial intelligence (AI)-based natural language processing algorithms to identify text corresponding to the one or more key terms; and indicating, in the display of the second list of engineering documents within the second region, those engineering documents of the second list that include text corresponding to the one or more key terms.

Also disclosed are computer-implemented methods for overcoming limitations of artificial intelligence (AI)-based natural language processing algorithms, such as the inability of out-of-the-box document similarity machine learning models to comprehend domain-specific terminology. Thus, in some instances, the disclosed methods and systems may further comprise providing a graphical user interface that allows users to manually define domain-specific terminology using standard English wording. In some instances, the disclosed methods and systems may further comprise providing a graphical user interface that allows users to manually define relationships between semantically-similar acronyms, words, and/or phrases. In some instances, the disclosed methods and systems may further comprise a backend computing system configured to pre-process engineering documents using said user definitions prior to applying AI-based natural language processing algorithms. In some instances, the disclosed methods and systems may further comprise supporting scripts which, when executed, automatically find and present to the user instances of incomprehensible vocabulary identified in the engineering requirements documents uploaded by the user.

Also disclosed are computer-implemented methods for automated analysis of engineering requirements comprising: receiving a first set of one or more engineering documents comprising one or more engineering requirement documents; receiving a second set of one or more engineering documents; receiving a first input from a user indicating a selection of one or more engineering requirement documents from the first set; processing the one or more selected engineering requirement documents using one or more processors configured to run one or more artificial intelligence (AI)-based natural language processing algorithms to identify a set of one or more key terms; processing the engineering documents of the second list using the one or more artificial intelligence (AI)-based natural language processing algorithms to identify text corresponding to the one or more key terms; and identifying those engineering documents of the second set that include text corresponding to the one or more key terms.

In some instances, the computer-implemented methods may further comprise determining, using the one or more natural language processing algorithms, a relationship (e.g., a priority, a dependency, a causal constraint, a resource constraint, or a discretionary constraint) between the one or more engineering requirement documents selected from the first set and those engineering documents of the second set that include text corresponding to the one or more key terms. In some instances, the one or more artificial intelligence (AI)-based natural language processing algorithms may comprise a Support Vector Machine (SVM) algorithm, a Bayesian Network algorithm, a Maximum Entropy algorithm, a Conditional Random Field algorithm, a Neural Network or Deep Learning algorithm, a Bidirectional Encoder Representations from Transformers (BERT) algorithm, a Term Frequency-Inverse Document Frequency (TF-IDF) algorithm, or any combination thereof. In some instances, the computer-implemented method may be packaged as a containerized web application.

Non-limiting examples of the key features of the RAAM traceability tool described herein include: (i) the capability to compare two sets of requirements and determine, for each requirement in a first set of requirements, a list of requirements in a second set of requirements that are the most similar semantically, (ii) the unique GUI provided as part of the traceability tool, and (iii) the ability to export linkages established by the user to a linking table.

The capability to compare two sets of requirements and determine, for each requirement in a first set of requirements, a list of requirements (e.g., the top 5, 10, or 20) in a second set of requirements that are the most similar semantically is accomplished employing the following steps in the disclosed algorithms: (1) pre-processing of the requirements text (which can involve; (i) cleaning, lemmatization, and other standard preprocessing procedures, (ii) expanding acronyms and replacing out-of-vocabular terminology with equivalents that the user has defined in their domain model, and (iii) removing high-frequency words and stopwords (such as "shall"); (2) vectorising the requirements documents using, for example, TF-IDF and/or BERT, to determine requirement similarity using, e.g., cosine similarity (separately for TF-IDF and/or BERT); (3) consolidating the resulting requirement similarity scores from TF-IDF and/or BERT into a single set of similarity scores; and (4) post-processing (which can involve: (i) if hierarchy was specified, boosting or lowering the calculated similarity between two requirements based on if their children/parents also had/did not have a high/low similarity to the same requirement; (ii) using user-defined mappings in the user's domain model to boost similarity score between two requirements that share mapped words; and (iii) ordering and limiting the returned requirement matches to, e.g., the top 20 best matches for each requirement.

The GUI of the traceability tool provides a two-column view that allows users to view, e.g., the top 20 closest matches to a given requirement, and gives the user the ability to create links between a requirement and the matches the user deems accurate.

The capability to export the linkages the user establishes (via the traceability GUI) into a linking table, which summarizes the traceability between requirements in the first set to those in the second set, facilitates the ease-of-use of the tool and provides a convenient output format.

Non-limiting examples of the key features of the RAAM INCOSE quality analyzer described herein include: (i) the capability to scan requirements documents for violation of INCOSE standards (comprising 50+ rules) for well-written requirements, including identifying word(s) or phrases that violate a given rule, and (ii) the unique INCOSE quality analyzer GUI that provides a multi-column view that allows users to select indicated requirements and view INCOSE rules that they violate (including the ability for users to inspect the specific word(s) or phrases that violated that rule), and allows users to edit the requirement text and re-run the INCOSE analyzer to determine whether the violation has been corrected or if new violations have been created.

Definitions: Unless otherwise defined, all of the technical terms used herein have the same meaning as commonly understood by one of ordinary skill in the art in the field to which this disclosure belongs.

As used in this specification and the appended claims, the singular forms "a", "an", and "the" include plural references unless the context clearly dictates otherwise. Any reference to "or" herein is intended to encompass "and/or" unless otherwise stated.

As used herein, the terms "comprising" (and any form or variant of comprising, such as "comprise" and "comprises"), "having" (and any form or variant of having, such as "have" and "has"), "including" (and any form or variant of including, such as "includes" and "include"), or "containing" (and any form or variant of containing, such as "contains" and "contain"), are inclusive or open-ended and do not exclude additional, un-recited additives, components, integers, elements or method steps.

As used herein, the term "engineering artifact" refers to any of a variety of documents associated with an engineering project (e.g., a systems engineering project) including, but not limited to, software or system requirements documents, software or system design constraint documents, software or system specifications, software or system architecture descriptions, software program modules and descriptions thereof, software data models, software or system test cases, software or system quality requirements, etc.

As used herein, the terms "artificial intelligence" and "machine learning" are used interchangeably and refer to the use of any of a variety of algorithms known to those of skill in the art that may be trained to process input data and map it to a learned output, e.g., a prediction, decision, control signal, or set of instructions.

As used herein, the term "domain model" refers to a database-stored dictionary created and populated by a user through a graphical user interface, containing English definitions and replacements for domain-specific acronyms, out-of-vocabulary terminology, and user-defined mappings between related terminology and/or phrases.

As used herein, the term "mapping" refers to a user-defined relationship between acronyms, words, and/or phrases that is a part of a user's domain model. A mapping indicates that a group of acronyms, words, and/or phrases are semantically related, and it is used by a backend computer system to calculate the text similarity more accurately between two engineering documents.

As used herein, the term "cloud" refers to shared or sharable storage of software and/or electronic data using, e.g., a distributed network of computer servers. In some instances, the cloud may be used, e.g., for archiving electronic data, sharing electronic data, and analyzing electronic data using one or more software packages residing locally or in the cloud.

As used herein, the term "cloud computing platform" refers to the operating system and hardware of a computer server (or distributed network of computer servers connected via, e.g., the Internet) that is configured to transfer, process, and/or store electronic data in the cloud.

As used herein, the term "virtualization method" refers to a process where virtual copies of a software application are created and delivered from a server to an end user's device, e.g., a computer, laptop, smartphone, or tablet.

As used herein, the term "containerized web application" refers to an operating system-level virtualization method for deploying and running distributed applications without launching an entire virtual machine (VM) for each application. In some instances, multiple applications or services may run on a single host and access the same operating system kernel (a computer program at the core of a computing platform's operating system that resides in memory and facilitates interactions between the hardware and software components of the computing platform).

The section headings used herein are for organizational purposes only and are not to be construed as limiting the subject matter described.

Artificial Intelligence-Based Systems Engineering Requirements Analysis:

Systems engineering is an interdisciplinary field focused on the design, integration, and management of complex systems, and encompasses the development of process management, system optimization, and risk management tools for such projects. A common approach to systems engineering project management uses the "waterfall model"—a linear project management approach where client requirements and/or other stakeholder requirements are gathered, and a project plan comprising several sequential project phases is developed to accommodate the requirements. Gantt charts, for example, are a preferred tool for program or project managers employing the waterfall approach, and allow one to map tasks, subtasks, and dependencies at each phase of the project. The typical phases of a waterfall project management plan may include: (i) requirement gathering, analysis, and documentation, (ii) system design, (iii) implementation (e.g., system prototype development), (iv) system testing, (v) system delivery and deployment, and (vi) system maintenance.

The requirements gathering, analysis, and documentation phase comprises the tasks undertaken to determine, analyze, document, validate, and manage system requirements (e.g., design objectives, timeline and cost objectives, etc.) to be met while taking into account the possibly of conflicting requirements from various stakeholders. Requirements analysis is used to identify design constraints and to develop functional and performance requirements for the system, i.e., the client's requirements or other stakeholder requirements are translated into a set of functional and performance requirements that define what the system must do and how well it must perform. Design constraints define those factors that limit design flexibility, e.g., environmental factors, the need to defend against internal or external threats, and applicable contract, customer or regulatory standards. Functional requirements define, for example, quantity (how many), quality (how good), coverage (how far), time lines (when and for how long), and availability (how often). Requirements analysis is critical to the success or failure of a system or software project, and typically requires extensive and laborious document review by technical domain experts. The system requirements must be complete, documented, traceable, related to identified project objectives, and defined in sufficient detail to ensure accurate system design.

In addition to being traceable (e.g., to source documents), the system requirements are analyzed to determine project relationships and dependencies, e.g., to identify the required subject matter experts, resources, vendors, etc., and task priorities, task dependencies, etc. Project dependencies may arise from, for example, logical constraints (e.g., that certain tasks cannot be initiated until after others have been complete), resource constraints (e.g., that certain tasks cannot be initiated until required resources (personnel, materials, etc.) become available), or discretionary (preferential) constraints.

As noted above, existing tools force users to map traceability between engineering documentation manually. The disclosed methods and systems use AI-based natural language processing to facilitate and accelerate the mapping of relationships between system requirements and other engineering artifacts.

Systems engineering is transitioning from traditional approaches to engineering project management (e.g., Gantt chart-based waterfall approaches) to more agile digital engineering approaches that seek to leverage authoritative sources of system data and engineering models drawn from a continuum of engineering disciplines to support system design and development lifecycle activities from concept through end-of-life system disposal. The goals of the digital engineering paradigm shift are to: (i) formalize the development, integration, and use of engineering models (e.g., artificial intelligence and machine learning models) to inform enterprise and program decision-making, (ii) provide an enduring, authoritative source of factual engineering knowledge, (iii) incorporate technological innovation to improve the engineering practice, (iv) establish a supporting infrastructure and digital engineering environments to perform activities, collaborate, and communicate across program and project stakeholders, and (v) transform the culture and workforce to adopt and support digital engineering across the program or project lifecycle. Examples of the benefits to be achieved from the digital engineering approach include support for informed decision making and greater insight through increased transparency, enhanced communication between program or project teams, increased understanding of system design requirements and greater flexibility/adaptability in design, increased confidence that the system will perform as expected, and increased efficiency in engineering and acquisition practices. The potential capabilities of such a digital engineering platform include, but are not limited to, requirements collaboration and traceability functionality that links mission objectives, system of systems architectures, and system architectures, with system behavior simulation and trade-offs analysis, while also supporting functional digital mock-up capabilities, electronic and software architecture design (including hardware architecture and software architecture), applicative software modeling, and systems safety and reliability assessment capabilities.

FIG. 1 provides a non-limiting schematic illustration of a digital engineering environment platform (DEEP) 100. In some instances, the disclosed methods and systems for AI-based systems engineering requirements analysis may be incorporated into a digital engineering environment platform 100 that comprises a plurality of custom tools and graphical user interface (GUI) dashboards 102. As illustrated in FIG. 1, for example, the tools and dashboards 102 may comprise, e.g., a requirements analysis using artificial intelligence for mapping (RAAM) tool as described herein, as well as other systems engineering tools, data collection reduction and analysis prototype (DCRA) test and evaluation tools, an access point for the Berd Integrated Risks Database (BIRD), or any combination thereof. These tools and dashboards provide the capability to access a variety of uploaded engineering artifacts (e.g., statement of work (SOW) documents 104, systems requirements definition (SRD) and minimum viable product (MVP) documents 106, and information system abbreviated capability development documents (IS A-CDDs) 108), and to communicate with and exchange data with a variety of commercial systems engineering software packages (e.g., IBM Dynamic Objective Oriented Requirements System (DOORS) 110 for requirements management (IBM, Armonk, NY); Cameo DataHub 112 (Dassault Systémes, Waltham, MA); model based systems engineering (MBSE) software 118 (e.g., MagicDraw from No Magic, Inc., Allen, TX); the Scaled Agile Framework® (SAFe®, Atlassian, San Francisco, CA) package 122 of organization and workflow patterns for implementing agile engineering practices; the Confluence (Atlassian, San Francisco, CA) team workspace software package and Bitbucket 120—a source code repository hosting service provided by Atlassian; JIRA® (Atlassian, San Francisco, CA) 122—an issue tracking product that allows bug tracking and agile engineering project management; Zephyr 124 (Smartbear, Somerville, MA)—a real time test management platform; and, optionally, Tasktop (Austin, TX)—a software delivery management tool; Sodius (Sodius Willert, Royal Oak, MI)—engineering software tools to improve traceability, exchange, and sharing of engineering data; and Persistent digital engineering tools (Persistent Systems, Santa Clara, CA), collectively indicated as 114). As illustrated in FIG. 1, the platform may also provide access to internal and/or external science and technology resources 116 (such as the MITRE Innovation program, the SBIR-STTR government grant programs, and the U.S. Army Combat Capabilities Development Command (DEVCOM)—the Army's technology leader and largest technology developer, etc.). The DEEP platform facilitates traceability between systems engineering requirements, systems architecture, and systems assessment artifacts in a digital engineering environment.

Figure 2:
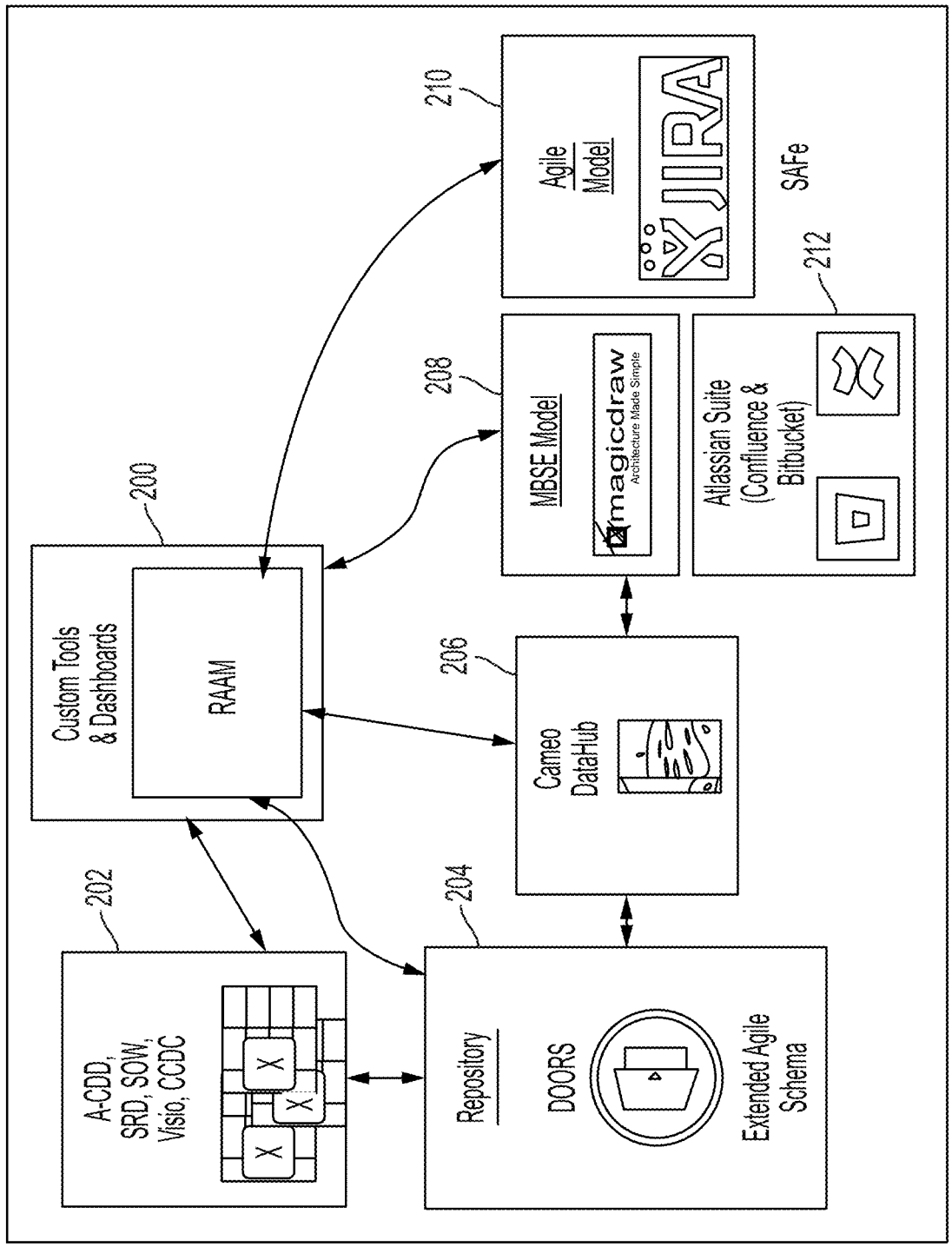
FIG. 2 provides a non-limiting schematic illustration of an artificial intelligence-based engineering requirements analysis platform as described herein.

FIG. 2 provides a non-limiting schematic illustration of an artificial intelligence-based engineering requirements analysis (RAAM) platform 200 as described herein. RAAM supports the analysis, manipulation, and management of requirements, architecture, agile artifacts, and market research throughout the DEEP platform. The tool allows users to access uploaded systems engineering documents (e.g., systems requirement documents and other engineering project documents 202 (engineering artifacts)) and process them using one or more AI-based natural language processing models to extract system requirements information, manually define domain-specific terminology and relationships between semantically similar terms to aid said artificial intelligence (AI)-based natural language processing models, compare engineering documents, determine relationships between systems requirement documents and other project documents, and trace requirements to, for example, system test and evaluation data. The RAAM tool provides a front-end graphical user interface as well as the back-end computing infrastructure to support AI-based natural language processing. The tool also interfaces with a variety of commercial software packages as described above (e.g., IBM DOORS 204, Cameo DataHub 206, MagicDraw 208 and other model based systems engineering (MBSE) software packages, JIRA 210, Confluence and Bitbucket 212, etc. In some instances, the tool facilitates integration and/or updating of systems requirement documents, e.g., from legacy projects, and facilitates improvement in systems requirement documentation by implementing INCOSE or IEEE standards.

Figure 3:
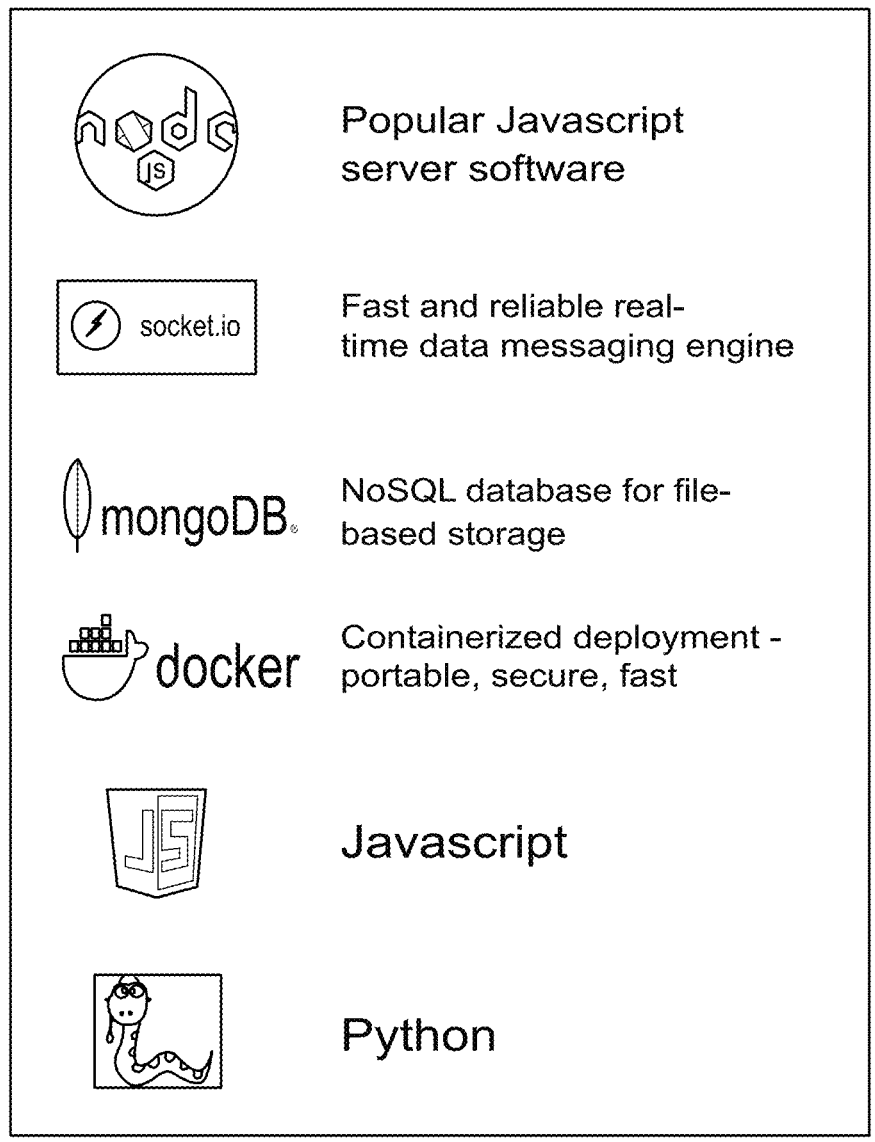
FIG. 3 provides non-limiting examples of a technology stack used for natural language processing and text matching in one embodiment of the artificial intelligence-based engineering requirements analysis platform described herein.

FIG. 3 provides non-limiting examples of a technology stack used for natural language processing and text matching in one embodiment of the artificial intelligence-based engineering requirements analysis platform (RAAM) described herein. The requirements analysis tool may be implemented using multiple layers of software, e.g., Node (Javascript server software), Socket.io (a real-time messaging engine), MongoDB (a NoSQL database for file based storage), Docker (for containerized deployment of web-based applications), and Javascript and Python code.

Figure 4:
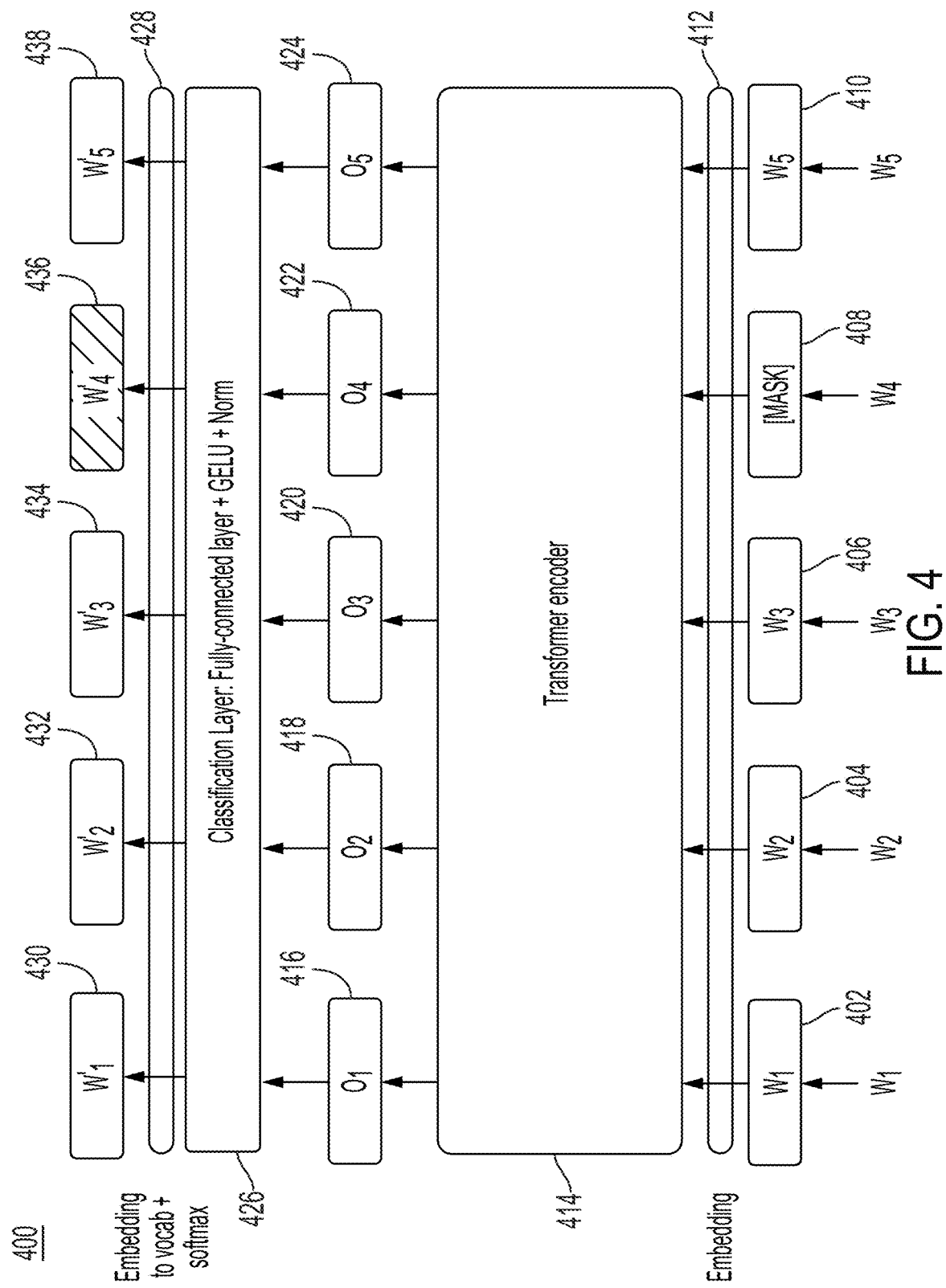
FIG. 4 provides a non-limiting schematic illustration of a machine learning-based process for performing natural language processing and text matching according to one embodiment of the artificial intelligence-based engineering requirements analysis platform described herein.

FIG. 4 provides a non-limiting schematic illustration of a machine learning-based process 400 for performing natural language processing and semantic text matching using, e.g., a BERT neural network. Document text is input on a word-by-word basis (e.g., Word 1 (402), Word 2 (404), Word 3 (406), Word 4 (408), and Word 5 (410)) via input layer 412 and processed by a transformer encoder 414 before being output (e.g., Output 1 (416), Output 2 (418), Output 3 (420), Output 4 (422), and Output 5 (424)) to a final classification layer 426 comprising, e.g., a fully connected layer that incorporates a Gaussian Error Linear Units (GELU) activation function and a Norm function to estimate the magnitude of the error in the model's prediction. In some instances, input mask(s) 408 may be used to select words/phrases of interest (i.e., one or more key terms) for the model to identify and classify text corresponding to the words/phrases of interest 436. In some instances, the output may comprise text corresponding to the one or more key terms (e.g., $W'_1$ (430), $W'_2$ (432), $W'_3$ (434), $W'_4$ (436), and $W'_5$ (438)) where the identified text is classified as belonging to the training vocabulary used to train the model by embedding layer 428 and the accuracy of the classification is weighted according to a softmax function, i.e., a mathematical function that converts a vector of numbers (i.e., transformed text) into a vector of classification probabilities, where the probabilities of each classification value are proportional to the relative scale of each value in the vector.

In some instances the natural language processing used in the disclosed methods and systems may comprise or further comprise the use of the Term Frequency—Inverse Document Frequency (TF-IDF) algorithm for token-based word matching. In token classification, the first step is to tokenize the given input text (i.e., identify the start and end of the words and punctuation in the text), following which the task is to assign to each token the class (or tag) that it belongs to. As described elsewhere herein, the TF-IDF algorithm provides a statistical measure that evaluates how relevant a word is to a document in a collection of documents, and is based on multiplying two metrics: (i) how many times a word appears in a document, and (ii) the inverse document frequency of the word across a set of documents.

In some instances, the disclosed methods and systems for systems requirement analysis may utilize a plurality of machine learning and/or natural language processing algorithms, e.g., BERT neural networks and TF-IDF algorithms, deployed serially or in parallel, for on-the-fly processing of engineering documents.

The RAAM tool's document analysis and term matching capabilities are designed to accurately identify high-probability semantic matches between two sets of requirements. The RAAM's matching script may be written, for example, in Python and may employ a variety of pre-processing, vectorization, and post-processing open-source and/or custom capabilities to generate a final document similarity result (see below for an example of the tool's output). The script is designed to ingest the serialized requirements extracted by RAAM's requirement extraction script (which runs directly prior to the running of the matching script).

Prior to applying any sort of artificial intelligence (AI)-based natural language processing or machine learning model to engineering text, it is imperative that the text is preprocessed in preparation for being fed into the NLP models. Universally, preprocessing often includes cleaning the text to match an ideal ingestion state, which may involve removing superficial punctuation, transforming words through case changing, stemming, and/or lemmatization, and removing stop-words.

Examples of the one or more pre-processing steps that may be performed prior to performing document text matching include, but are not limited to, (i) tokenization (e.g., splitting phrases, sentences, paragraphs, or entire text documents into smaller units such as individual words or terms which are called tokens), (ii) lemmatization (e.g., removing inflectional endings from words based on the use of a vocabulary and/or morphological analysis to return the base or dictionary form of a word, which is known as the lemma), (iii) text cleaning (e.g., the process of preparing raw text for Natural Language Processing (NLP) so that it is ready to input to an artificial intelligence/machine learning model; noise in the text may arise from, for example, the presence of emojis, punctuations, different cases, whitespaces and other special characters, "stop words" identified during tokenization, etc.), (iv) term frequency mapping (e.g., to remove words that appear in greater than 50% (or another specified percentage) of the text documents being analyzed), and (v) identification and replacement of acronyms and domain-specific terminology with synonyms comprised of common English words.

With respect to the latter, in some instances the disclosed methods and systems may implement additional specialized pre-processing steps based on the specific machine learning model and the desired outcome. For example, a system may need to address the domain-specific vocabulary and acronyms found within the engineering documents being processed, which a pre-trained neural network or deep learning-based natural language processing model such as BERT may be incapable of interpreting. To overcome this limitation, the disclosed methods and systems may preemptively "expand" acronyms into individual words and replace out-of-vocabulary words (e.g., those not included in the NLP model's word list) with in-vocabulary words. In some instances, due to the domain-specific nature of the aforementioned vocabulary, these acronym expansions and vocabulary replacements may be provided by the user who is feeding the requirements documents into the system.

Vectorization—the process of using an algorithm or trained machine learning model to produce a vector representation of each requirement based on the extracted requirement text—may be performed using any of a variety of approaches known to those of skill in the art. Examples include, but are not limited to, (i) use of the Term Frequency-Inverse Document Frequency (TF-IDF) algorithm discussed elsewhere herein to produce a document-term matrix and generate sparse feature vectors based on the count of each term in the corpus and the term's uniqueness (available as open source code through Sklearn's TfidfVectorizer), and (ii) use of a Bidirectional Encoder Representations from Transformers (BERT) model as described elsewhere herein to generate feature vectors. Non-limiting examples of open source code that may be used to perform some of these approaches include gensim's LDA Model, gensim's Coherence Model, Google's BERT model, Nils Reimer's SentenceTransformers (which uses a Google BERT model that has been fine-tuned on a Siamese (twin) neural network structure). In some instances, a BERT model that has been fine-tuned on a set of domain-specific requirements documents (e.g., Army/DoD/Government requirements documents) may be used to further improve text matching performance. In some instances, the disclosed methods and systems perform post-processing of results derived from the one or more machine learning (ML)-based natural language processing (NLP) models. Traditionally, this includes manipulating the outcome such that it can be interpreted and used by the next stage in the system—which might be another script, a front-end browser client, or the end user. In some instances, post-processing may involve more specialized steps which enhance or otherwise improve the output of the one or more ML-based NLP models. For example, in the case of using two or more document similarity schemes, post-processing would involve consolidating the two results into a single output that describes the similarity of two documents. In another example, enhancements to document similarity scores may be applied by the system based on predetermined factors, such as increasing or decreasing similarity scores for child documents of highly or poorly scored documents, or boosting similarity scores between documents containing vocabulary deemed related by the end user.

Examples of the one or more post-processing steps that may be performed following document text matching include, but are not limited to, (i) evaluation of the similarity between sets of vectorized documents (e.g., using Sklearn's TF-IDF vectorizer metric function to evaluate the cosine similarity (a measure of similarity between two sequences of numbers) between sets of feature vectors), (ii) for each document, finding the compared documents with the highest similarity score and ordering them from highest to lowest similarity to identify, e.g., the 20 best matches, (iii) refinement of the resulting document similarity scores by boosting or decreasing scores based on an engineering requirement's hierarchical relationship (if one exists) with its relatives, and (iv) using mappings between vocabulary defined by the user to boost scores of requirements containing linked vocabulary.

The following listing provides a non-limiting example of the output for the text matching process that is used by the RAAM tool to identify relationships/dependencies between engineering artifacts in two different requirement documents. The nested list indicates mappings from requirements to their most similar matches, ordered from most to least similar, where IDs such as "1-2.1" indicate a unique identifier for each requirement and numbers such as "0.02" (2%) denote the degree of similarity.

```
{
    "1-2.1": {
        "0-2": 0.03,
        "0-1.2": 0.03,
        "0-1.2.3": 0.03,
        "0-1": 0.03,
```

-continued

```
    "0-1.1": 0.02,
    "0-1.1.1": 0.02,
    "0-2.4": 0.02,
    "0-2.1": 0.02,
    "0-1.2.1": 0.02,
    "0-1.1.3": 0.02,
    "0-1.1.2": 0.02,
    "0-1.2.2": 0.02,
    "0-2.4.3": 0.02,
    "0-2.4.2": 0.02,
    "0-2.3.2": 0.02
  },
  "1-2.1.1": {
    "0-1.1.1": 1.0,
    "0-1.2.1": 0.48,
    "0-1.1.3": 0.44,
    "0-1.1.2": 0.43,
    "0-1.1": 0.36,
    "0-1.2.2": 0.29,
    "0-1.2": 0.16,
    "0-1.2.3": 0.15,
    "0-1": 0.14,
    "0-2": 0.04,
    "0-2.4": 0.03,
    "0-2.1": 0.03,
    "0-2.4.3": 0.03,
    "0-2.4.2": 0.03
  }
}
```

Figure 5:
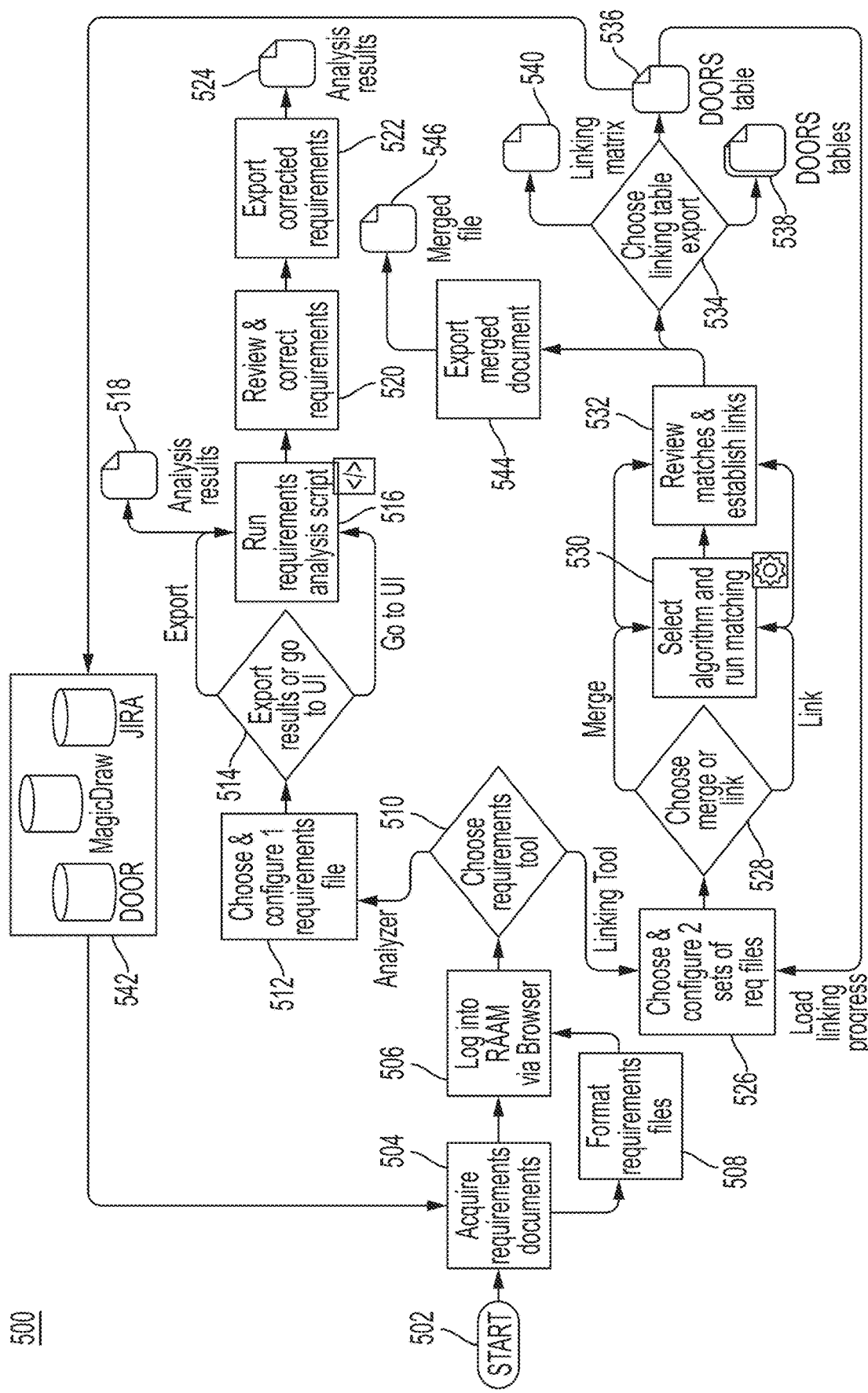
FIG. 5 provides a non-limiting schematic illustration of a flowchart for front-end processing for a requirements analysis using artificial intelligence for mapping (RAAM) tool as described herein.

FIG. 5 provides a non-limiting example of a flowchart for a process 500 that illustrates front-end processing for a requirements analysis using artificial intelligence for mapping (RAAM) tool as described herein. The process starts at step 502, with a user acquiring a batch of requirements documents to upload into RAAM at step 504, and logging into the RAAM tool at step 506 via a web browser. In some instances, the user may need to format the requirements documents at step 508, e.g., to ensure consistent formatting.

At step 510 in FIG. 5, the user selects a requirements tool for use in processing the input batch of requirements documents. In some instances, the user may choose the RAAM's INCOSE analyzer tool at step 510, which is used to scan requirements documents for writing mistakes. The user must select and configure a requirements file, 512, and may then choose to either export a requirements quality report file or work on the file within the user interface (UI), e.g., a graphical user interface (GUI). In either case, the requirements documents are processed by the RAAM's requirements INCOSE analysis script at step 516. The analysis results may be exported at step 518, or may be reviewed and corrected (e.g., via the user interface) at step 520, followed by export of an improved requirements document 524 at step 522 if the user successfully addressed the writing mistakes in the GUI.

In some instances, the user may choose the linking tool at step 510 in FIG. 5 for use in finding and establishing traceability between requirements across two or more sets of requirement files. At step 526, the user chooses and configures two sets of requirements documents for analysis. At step 528, the user then chooses whether their end goal is to establish many-to-many linkages between requirements identified in the two sets of requirements documents or create a merged requirements file, wherein requirements from one file become children of those in the other. At step 530, a natural language processing and text matching algorithm is selected for use, and the text matching process is performed for the two sets of requirements documents. The potential match results are reviewed at step 532 and links are established by the user between matching requirements identified in the two sets of requirements documents. Depending on the choice made by the user at step 528, the results may be exported at step 544 as a merged requirements file 546, or may be exported according to a selection made at step 534 as a DOORS table 536, as multiple DOORS tables 538, or in a standard linking matrix format 540. Results exported as a DOORS table 536 may be returned to step 526 as an indicator of requirements linking progress and/or saved to a model-based systems engineering software package (e.g., DOOR, MagicDraw, JIRA, etc.) at step 542.

Figure 6:
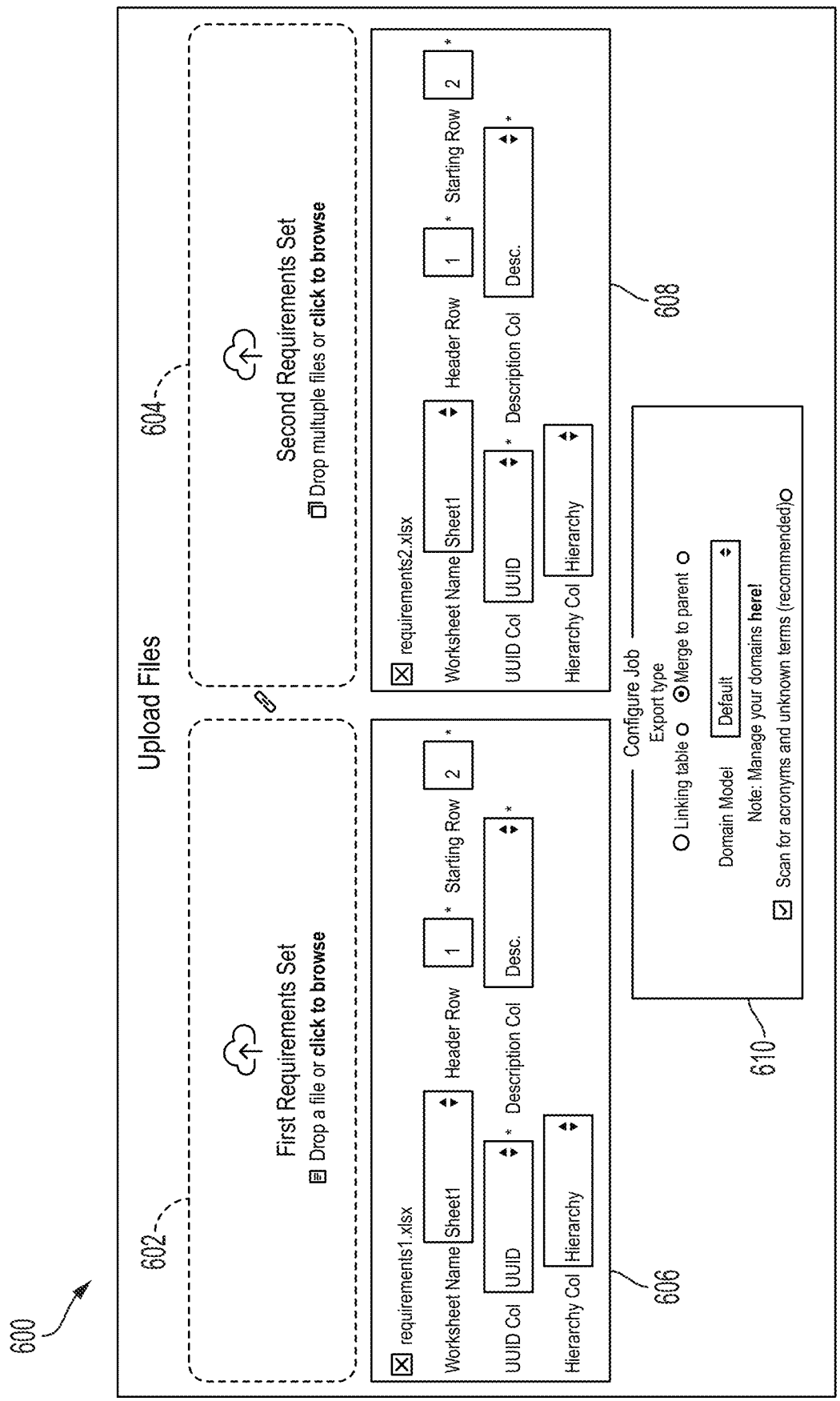
FIG. 6 provides a non-limiting example of a graphical user interface that allows users to access the functionality provided by the RAAM artificial intelligence-based engineering requirements analysis platforms described herein.
Figure 7:
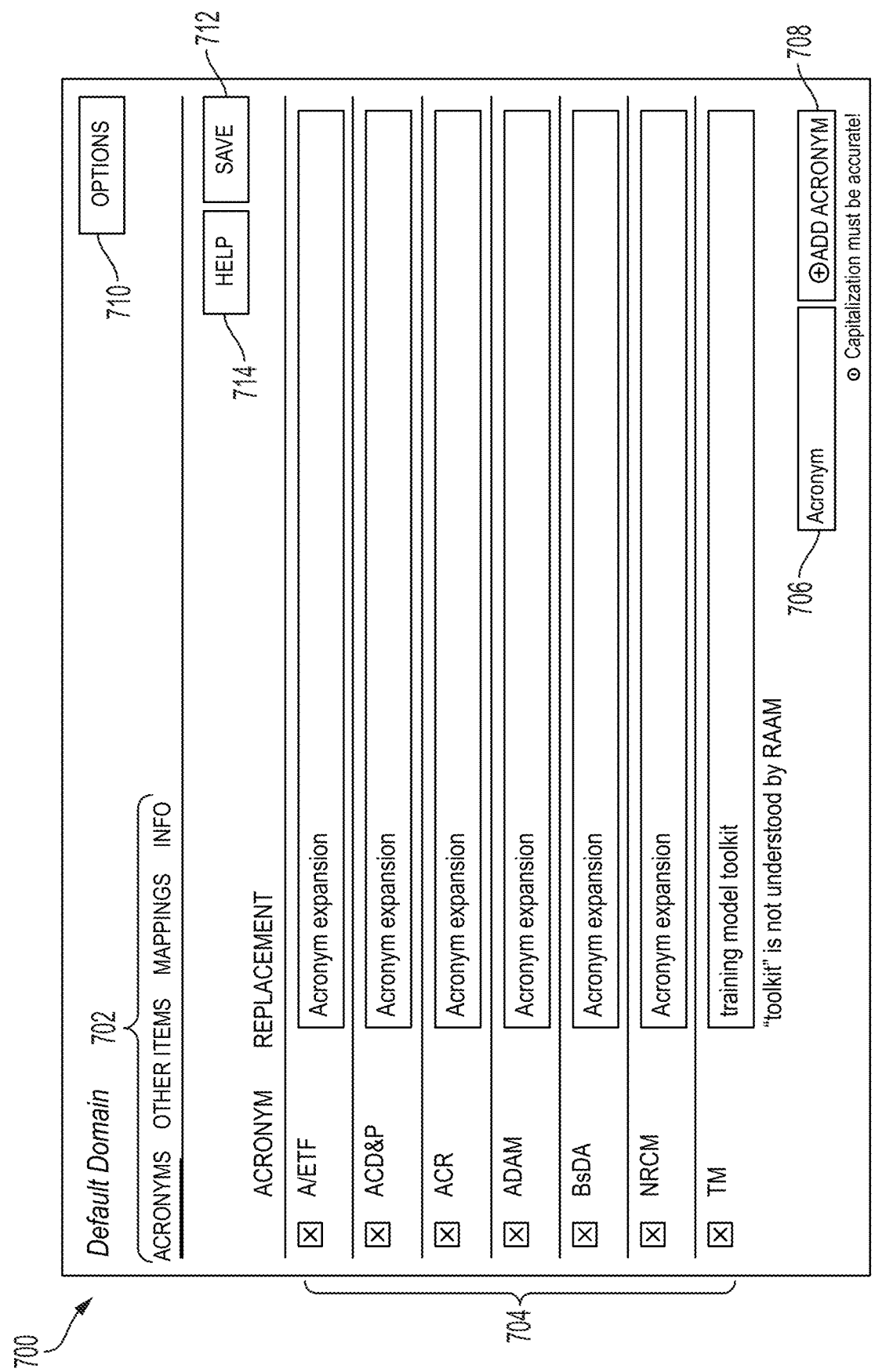
FIG. 7 provides another non-limiting example of a graphical user interface that allows users to access dictionaries in which they can define engineering domain-specific terminologies for use with the RAAM tool described herein.
Figure 8:
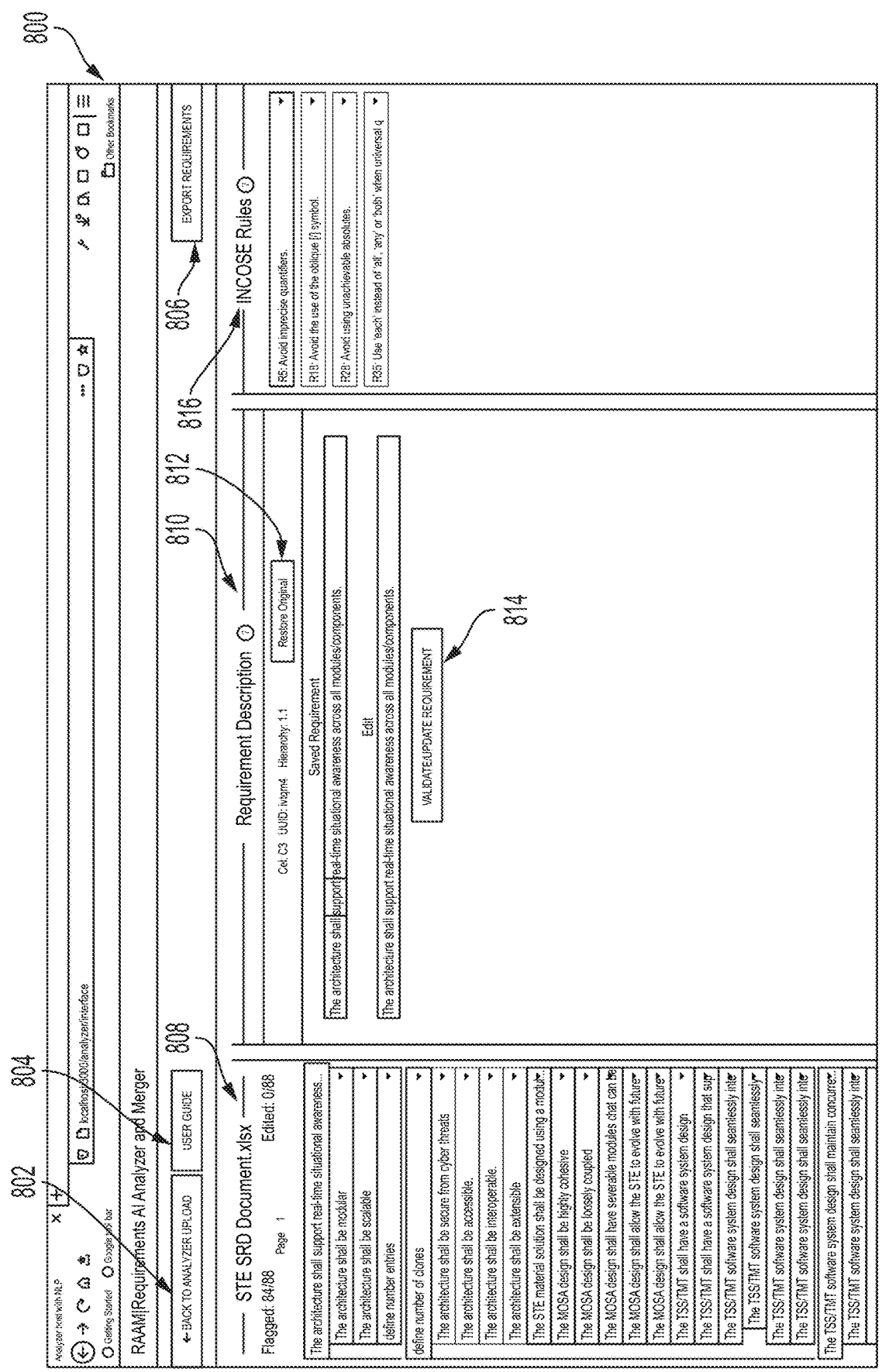
FIG. 8 provides another non-limiting example of a graphical user interface that allows users to access the functionality provided by the artificial intelligence-based engineering requirements analysis platforms described herein.

FIGS. 6, 7, and 8 provide non-limiting examples of the graphical user interface that allows users to access the functionality provided by the artificial intelligence-based engineering requirements analysis platforms described herein. As illustrated in FIG. 6, window 600 of the GUI allows users to upload a requirements document to a first set of requirements (e.g., a parent requirements file) in panel 602, and to upload multiple requirements documents to a second set of requirements (e.g., a child requirements file) in panel 604 (e.g., by dragging and dropping file names from a list of file names, or by browsing a directory of files). In some instances, the input fields displayed in panels 606 and 608 of the GUI for the first and second set of requirements, respectively, may include, for example, a worksheet name, a header row, a starting row, and a unique requirement identification number (UUID) column, and a description column. In some instances, the required input may be selected from a drop down list or by scrolling through a displayed list. Optional fields may include, for example, a hierarchy column, which contains hierarchical numbers identifying the parent-child or sibling relationship between requirements. Panel 610 provides user-selectable options for configuring the requirements analysis job, e.g., choice of analysis export options (e.g., linking table or a merged requirements file), a domain model (e.g., text matching models trained on specialized vocabularies for specialized technical domains), and the option of scanning the input documents for acronyms or unknown terms.

FIG. 7 provides a non-limiting example of a GUI window 700 that allows users to create domain models, for which they may define common English definitions and replacements of domain-specific acronyms, out-of-vocabulary terminology, and mappings between terminology. As seen in the example, users may add new terms, add definitions for those terms, and save their definitions. The user can then utilize these domain models when using the software's engineering documents-analyzing capabilities, to improve the ability of artificial intelligence (AI)-based natural language processing algorithms to understand domain-specific text. Tabs 702 allow the user to review acronyms, domain-specific terminology, mappings, or information about a default or user-selectable domain. Domain-specific terminology includes any words or phrases which have unique meaning within the user's domain of interest but either do not exist or have different meanings in the general English corpus. For example, "Dassault Rafale" is the name of a model of fighter aircraft, but does not have meaning in the general English language. "Mappings" are user-defined associations between words or phrases which may indicate that two documents are related. For example, the user may denote that the acronym "STE" and the word "soldier" are closely related. Under the "ACRONYMS" tab, as illustrated in FIG. 7, a list of acronyms commonly found in a default or user-selectable domain, and their corresponding expanded forms, are displayed in region 704. New acronyms can be added by the user by means of text entry window 706 and the "ADD ACRONYM" button 708, and saved using "SAVE" button 712. "OPTIONS" Button 710 provides access to a list of actions to perform against the domain model, including duplicating the domain, and importing and exporting a dictionary. "HELP" button 714 provides access to GUI help suggestions and/or answers to frequently asked questions. A similar interface is used to manage domain-specific terminology and mappings.

As illustrated in FIG. 8, another window 800 of the GUI allows users to review and edit RAAM analysis results for engineering requirement documents, and to automatically apply INCOSE rules. In some instances, a listing of specific requirements derived from a requirements document may be displayed, e.g., in panel 808 at the left side of the GUI illustrated in FIG. 8. Selected individual requirement(s) may be displayed in region 810, e.g., the central panel in FIG. 8, where the user may review or edit and save edited requirements. User function buttons may also be displayed, e.g., for restoring the original requirement 812, or for validating and updating an edited requirement 814. A third panel 816 may display, e.g., a list of applicable INCOSE rules which the user may select from for implementing in an updated requirements document. Other functional buttons that may be displayed include a button (or arrow) for returning to the RAAM analyzer upload page 802, for accessing a user guide 804, and/or for exporting the updated requirements document 806.

Figure 9A:
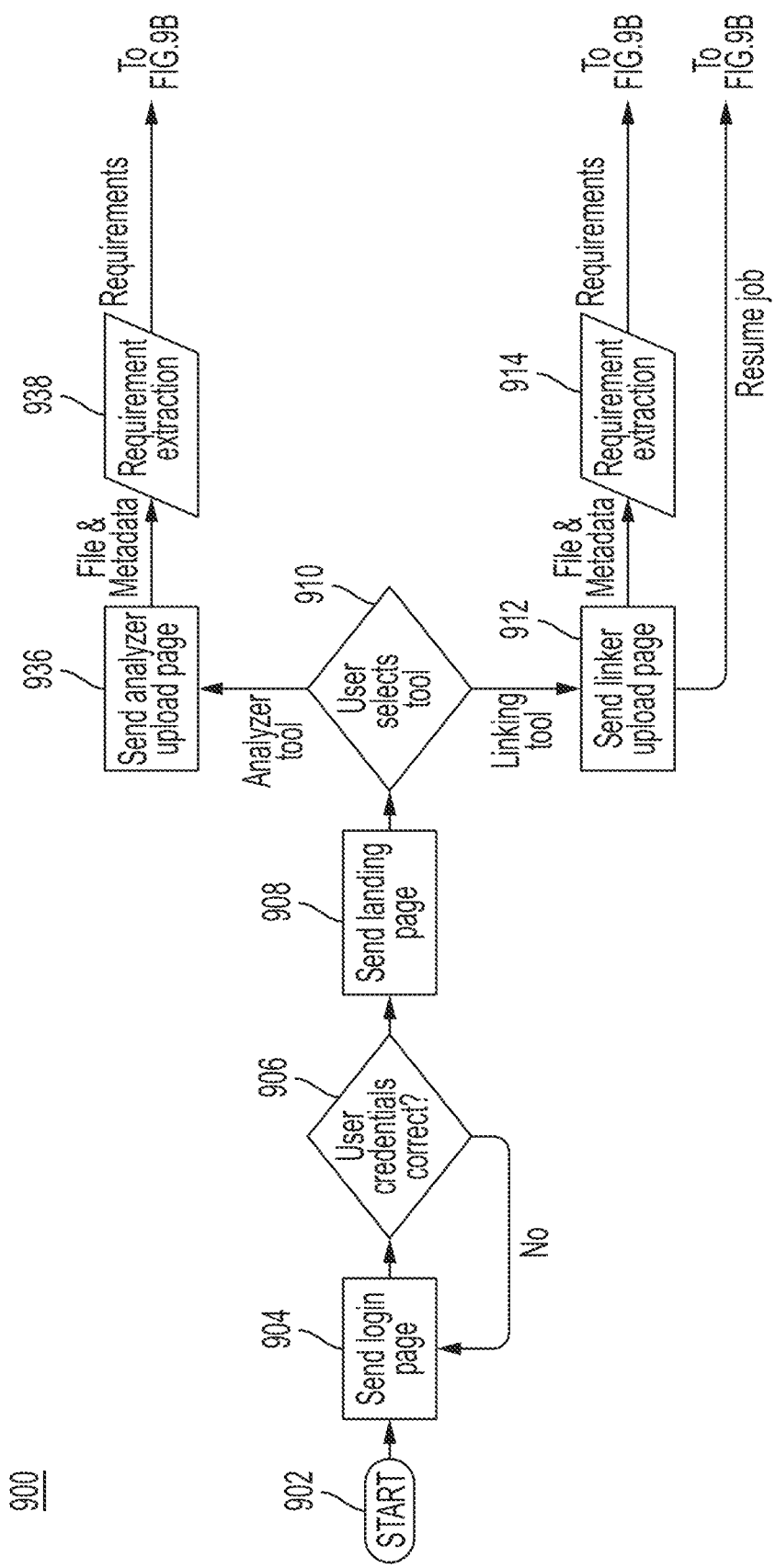
FIG. 9A provides a non-limiting example schematic illustration of a flowchart for back-end processing for a requirements analysis using artificial intelligence for mapping (RAAM) tool as described herein.
Figure 9B:
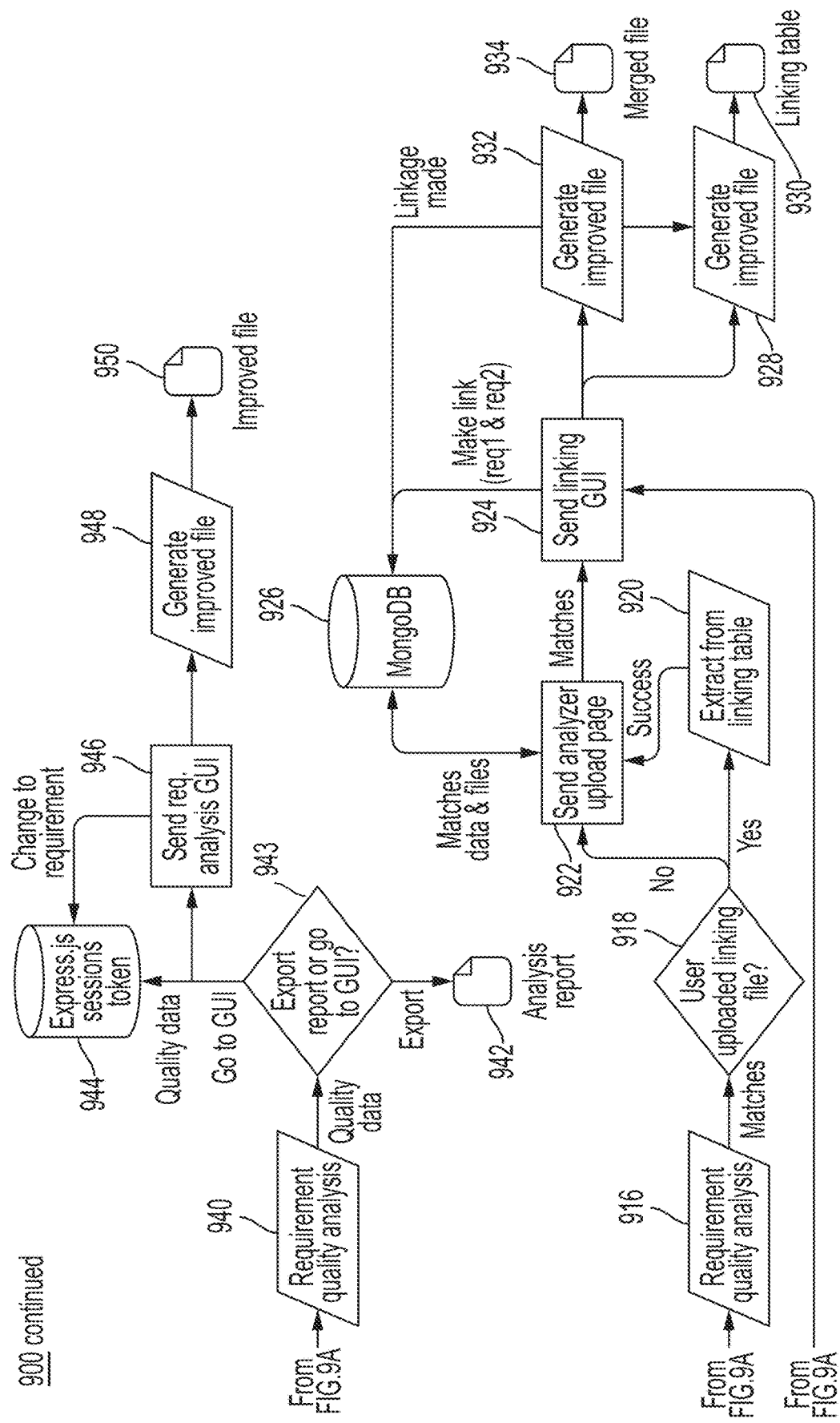
FIG. 9B is a continuation of FIG. 9A, and provides a non-limiting schematic illustration of a flowchart for back-end processing for a requirements analysis using artificial intelligence for mapping (RAAM) tool as described herein.

FIGS. 9A-B provide an example of a flowchart for a process 900 that illustrates the back-end processing for an artificial intelligence-based requirements analysis tool as described herein. Starting at step 902 in FIG. 9A, the system is prompted to send the user login page at step 904 and check the user's login credentials at step 906. If the user's login credentials are determined to be invalid, the user is returned to the login page. If the user's login credentials are determined to be valid, the user is sent to a landing page at step 908. The user selects between use of an analyzer tool and a linking tool at step 910. If the user selects the analyzer tool, the system is prompted to send the analyzer upload page at step 936. Requirements documents (and associated metadata) uploaded by the user are processed for requirements extraction at step 938, and the resulting requirements are then subjected to a requirements quality analysis (at step 940 in FIG. 9B). Continuing to refer to FIG. 9B, the requirements and associated quality data are optionally exported to an analysis report 942, or sent to the GUI, at step 943. If sent to the GUI, the system is prompted to send the requirements analysis GUI at step 946 and create an Express.js sessions token at step 944. The requirements analysis GUI provides the capability for interactive user review and editing of the identified requirements, as illustrated in FIG. 8, thereby allowing generation of an improved requirements file (e.g., one that meets INCOSE or IEEE standards) at step 948 that may be output at step 950.

Returning to FIG. 9A, if, at step 910, the user selects the linking tool, the system is prompted to direct the user to the traceability tool's upload interface at step 912. If the user wishes to resume an existing traceability work at step 912, they may do so by selecting "resume job" on an existing traceability job, which will automatically direct the user to the linking GUI (step 924). Otherwise, requirements documents (and associated metadata) uploaded by the user for two sets of requirement documents are processed for requirements extraction at step 914, and the resulting requirements are then subjected to a requirements similarity analysis (at step 916 in FIG. 9B), which automatically identifies and outputs potential "matches" between similar requirements. Continuing to refer to FIG. 9B, the system determines whether the user has uploaded a linking file at step 918. If not, the system redirects the user directly to the linking GUI (step 924) (in some instances, the system can be configured to send an analyzer upload page, step 922). If the user has uploaded a linking file however, links between requirements are extracted from the user-uploaded linking table at step 920, which will manifest as already-established links once the user is redirected to the linking UI (step 924). On step 924, where the identified matches between the two or more sets of requirements may be reviewed and approved by the user. Any linkages between requirements the user establishes on this GUI will be stored in the MongoDB database 926. Once the user is finished establishing traceability using the GUI, a linking table can be exported at steps 928 and 932, may be output as either an updated linking table 930 or a merged requirements file 934.

The disclosed methods and systems have been developed to automatically evaluate requirements for quality based on INCOSE rules, expedite system analysis, tag system requirements, associate requirements with research opportunities, conduct requirements gap analysis, and perform capability convergence analysis. In some instances, these computer-implemented methods may be implemented as a containerized web application that runs on a cloud-based computing platform.

Methods of Use:

The disclosed methods and systems may be applied to a variety of systems engineering use cases. Examples include, but are not limited to, mapping system requirements to system architecture, mapping system capabilities to mission objectives, mapping systems requirements to testing and evaluation, systems requirement documentation quality improvement, traceability analysis, "gaps and overlaps" analysis, change impact analysis, "program of record" analysis and convergence, and facilitating the transformation from traditional "waterfall" systems engineering approaches to an agile digital engineering methods.

For example, traceability analysis is the process of tracking forward or backward through a network of interrelationships between the components of a system and their documentation to establish that: (i) all the client's requirements have been satisfied, and (ii) that no unspecified features have been introduced. The disclosed methods and systems may be used to review the relationships between systems requirements and all engineering artifacts for a project or program to ensure traceability.

In "gaps and overlaps" analysis, the disclosed methods and system may be used to process requirement information for a first systems engineering project or program and evaluates the requirements documents for a second project to identify those that are correlated.

In "program of record" analysis, the system may be used, for example, to review and compare all of the requirement documents for a series of legacy programs in order to merge the requirements into a newly updated requirements document without missing any legacy requirements. For systems testing, the disclosed methods and systems may be used to map system requirements to test and evaluation results to ensure that, for example, all performance requirements have been met.

AI-Based Natural Language Processing:

Natural language processing (NLP) is an interdisciplinary field that combines aspects of linguistics, computer science, and artificial intelligence with a focus on developing methods for programming computers to process and analyze large amounts of natural language text. Many problems in natural language processing can be viewed as linguistic classification problems in which linguistic contexts are used to predict linguistic classes (Ratnaparkhi (1977), "A Simple Introduction to Maximum Entropy Models for Natural Language Processing", IRCS Technical Reports Series 81). Thus, in some instances, the disclosed methods and systems may utilize one or more supervised machine learning algorithms, i.e., algorithms that rely on the use of a set of labeled training data to infer the relationship between input text and a classification of the text according to a user-specified set of text categories. In some instances, the labeled training data set comprises a set of paired training examples, e.g., where each example comprises input text and the resultant classification of the text. Examples of supervised NLP machine learning algorithms include, but are not limited to, support vector machines (SVMs), Bayesian networks, maximum entropy algorithms, conditional random field (CRF) algorithms, and neural networks or deep learning algorithms. In some instances, the disclosed methods and systems may utilize a semi-supervised or unsupervised machine learning algorithm.

One of the challenges of applying machine learning to natural language processing is the need to transform text into numbers (known as "text vectorization") that can be processed by machine learning algorithms. Text vectorization is a fundamental step in the process of training a machine learning model to analyze text, and the choice of different text vectorization algorithms may have significant impact on outcomes. Examples of text vectorization algorithms include, but are not limited to, the binary term frequency algorithm, the "Bag of Words" (BoW) term frequency algorithm, the L1 normalized term frequency algorithm, the L2 normalized TF-IDF algorithm, and the Word2Vec algorithm. A word vector represents a document as a list of numbers, with one number for each possible word of the corpus.

Support vector machines are supervised learning algorithms that can be used for classification and regression analysis of text data. Given a set of training data examples (e.g., samples of input text), each marked as belonging to one of two or more text categories, an SVM training algorithm builds a model that assigns new examples of input text to one of the text categories.

Bayesian networks (also known as Bayes networks, belief networks, or decision networks) are probabilistic graphical models that represent a set of variables and their conditional dependencies via a directed acyclic graph. They are used for a wide range of tasks including prediction, anomaly detection, diagnostics, automated insight, reasoning, time series prediction, and decision making under uncertainty.

Maximum entropy algorithms offer an approach for combining diverse pieces of contextual evidence in order to estimate the probability of a certain linguistic class occurring with a certain linguistic context (Ratnaparkhi (1977), "A Simple Introduction to Maximum Entropy Models for Natural Language Processing", ibid.). Maximum entropy classifiers are probabilistic classifiers that can be used to solve a large variety of text classification problems such as language detection, topic classification, sentiment analysis, and the like.

Conditional random field (CRF) algorithms rely on statistical modeling methods and are often used for structured prediction. Whereas a classifier typically predicts a label for a sample of input text without considering adjacent segments of text, a CRF takes context into account in making predictions based on an application-dependent graphical model. For natural language processing, linear chain CRFs are often used which take into account sequential dependencies in making predictions.

Figure 10:
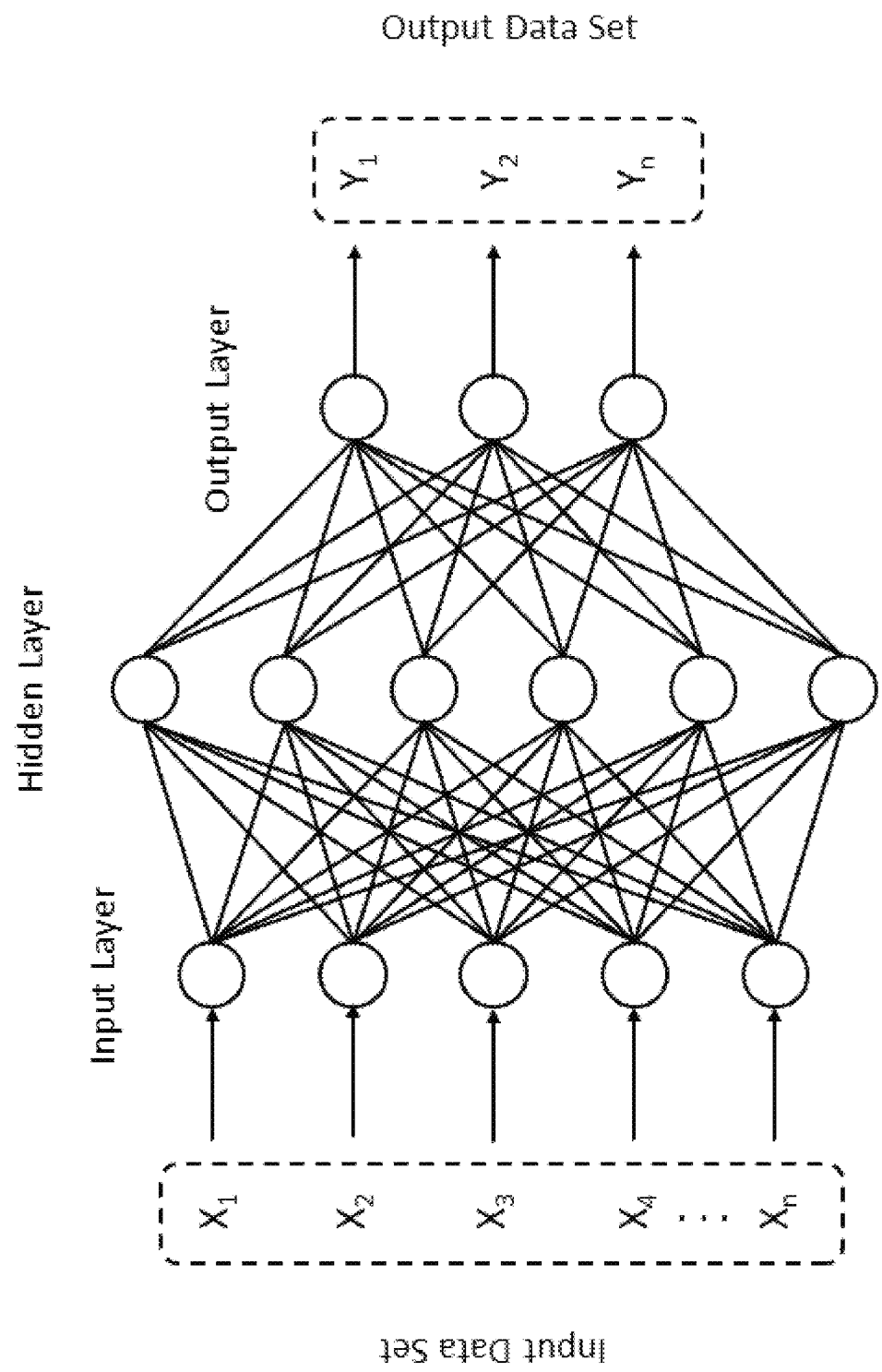
FIG. 10 provides a schematic illustration of an exemplary machine learning architecture comprising an artificial neural network with one hidden layer.
Figure 11:
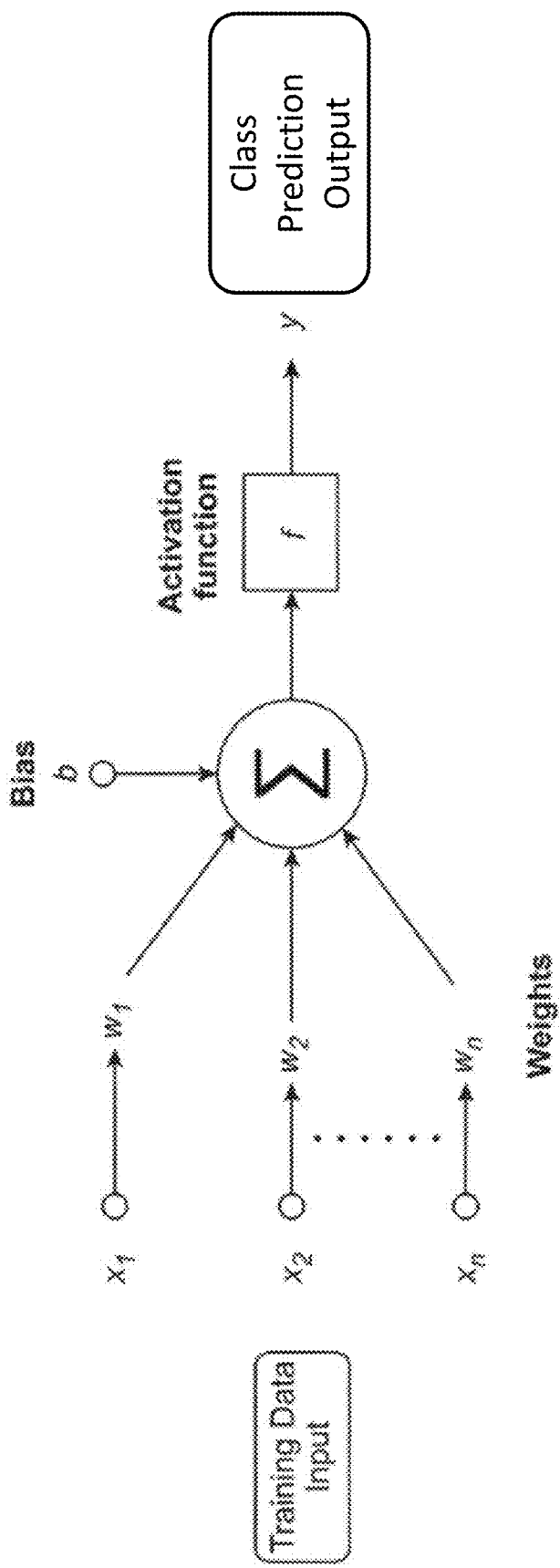
FIG. 11 provides a schematic illustration of an exemplary node within a layer of an artificial neural network or deep learning model architecture.

Artificial neural networks (ANNs) or deep learning algorithms generally comprise an interconnected group of nodes organized into multiple layers of nodes. For example, the ANN architecture may comprise at least an input layer, one or more hidden layers, and an output layer (see, e.g., FIG. 10). The ANN may comprise any total number of layers, and any number of hidden layers, where the hidden layers function as trainable feature extractors that allow mapping of a set of input data to a preferred output value or set of output values. Each layer of the neural network comprises a number of nodes (or neurons). A node receives input that comes either directly from the input data (e.g., a piece of input text converted to a numerical value) or the output of nodes in previous layers, and performs a specific operation, e.g., a summation operation. In some cases, a connection from an input to a node is associated with a weight (or weighting factor). In some cases, the node may, for example, sum up the products of all pairs of inputs, Xi, and their associated weights, Wi (FIG. 11). In some cases, the weighted sum is offset with a bias, b, as illustrated in FIG. 11. In some cases, the output of a neuron may be gated using a threshold or activation function, f, which may be a linear or non-linear function. The activation function may be, for example, a rectified linear unit (ReLU) activation function or other function such as a saturating hyperbolic tangent, identity, binary step, logistic, arcTan, softsign, parametric rectified linear unit, exponential linear unit, softPlus, bent identity, softExponential, Sinusoid, Sine, Gaussian, or sigmoid function, or any combination thereof.

The weighting factors, bias values, and threshold values, or other computational parameters of the neural network, can be "taught" or "learned" in a training phase using one or more sets of training data. For example, the parameters may be trained using the input data from a training data set and a gradient descent or backward propagation method so that the output value(s) (e.g., a text classification decision) that the ANN computes are consistent with the examples included in the training data set. The adjustable parameters of the model may be obtained from a back propagation neural network training process that may or may not be performed using the same computing platform infrastructure as that used for processing the input engineering documents according to the disclosed methods.

In some instances, the disclosed methods and systems may utilize a Bidirectional Encoder Representation from Transformer (BERT) machine learning model for natural language processing. A transformer is a deep learning model that weighs the influence of different parts of the input data (e.g., different segments of text) in making a prediction. Like recurrent neural networks (RNNs), transformers are designed to handle sequential input data, such as natural language text, for tasks such as translation and text summarization. The BERT algorithm is a transformer-based machine learning technique for natural language processing pre-training that was developed by researchers at Google, Inc. (see, for example, Devlin, et al. (2018), "BERT: Pre-training of Deep Bidirectional Transformers for Language Understanding", arXiv:1810.04805v2). BERT is designed to pre-train deep bidirectional representations from unlabeled text by jointly conditioning on both left and right context in all layers. As a result, the pre-trained BERT model can be fine-tuned with just one additional output layer to create state-of-the-art models for a wide range of tasks, such as question answering and language inference, without substantial task-specific architecture modifications (Devlin, et al. (2018), ibid.).

In some instances, the disclosed methods and systems may utilize a term frequency-inverse document frequency (TF-IDF) algorithm. TF-IDF provides a statistical measure that evaluates how relevant a word is to a document in a collection of documents, and is based on multiplying two metrics: (i) how many times a word appears in a document, and (ii) the inverse document frequency of the word across a set of documents, as indicated in Equation (1).

For a term i in document j:

$$w_{i,j} = tf_{i,j} \times \log\left(\frac{N}{df_i}\right) \quad \text{Equation (1)}$$

where $tf_{i,j}$ is the number of occurrences of term i in document j; $df_i$ is the number of documents containing term i; and N is the total number of documents.

TF-IDF increases proportionally to the number of times a word appears in a document, but is offset by the number of documents that contain the word, so that words that commonly appear in almost every document (e.g., this, what, and if) are given a low rank even though they may appear many times. TF-IDF is often used for automated text analysis and for scoring words in machine learning algorithms for natural language processing.

In some instances, the disclosed methods and systems may use a plurality of machine learning-based natural language processing algorithms to process engineering documents on the fly. For example, in some instances the disclosed methods and systems may use an SVM-based NPL algorithm, a Bayesian network-based NPL algorithm, a Maximum Entropy-based NPL algorithm, a CRF-based NPL algorithm, a neural network- or deep learning-based NPL algorithm, a BERT algorithm, a TF-IDF algorithm, or any combination thereof to process engineering documents on the fly.

In some instances, the disclosed methods and systems may utilize one, two, three, four, five, or more than five machine learning-based NPL algorithms in combination to process engineering documents on the fly. In some instances, two, three, four, five, or more than five machine learning-based NPL algorithms may be deployed serially for processing engineering documents on the fly. In some instances, two, three, four, five, or more than five machine learning-based NPL algorithms may be deployed in parallel (e.g., simultaneously) for processing engineering documents on the fly.

Training Data for Artificial Intelligence/Machine Learning Models:

The type of training data used for training an artificial intelligence or machine learning algorithm for use in the disclosed methods and systems may depend on, for example, whether a supervised or unsupervised approach is taken. In some instances, one or more training data sets may be used to train the algorithm in a training phase that is distinct from that of the application or use phase. In some instances, the training data may be continuously updated and used to update the machine learning algorithm in real time (or near real-time). In some cases, the training data may be stored in a training database that resides on a local computer or server. In some cases, the training data may be stored in a training database that resides online or in the cloud.

In some instances, the disclosed methods and systems may utilize, for example a pre-trained BERT model, where the pre-trained BERT model has been trained on the Wikipedia corpus or similar, publicly-available text database. In some instances, the disclosed methods and systems may utilize an application-specific or domain-specific NPL model, e.g., a BERT model trained on a dictionary of government terminology for use in analyzing systems engineering documents for the Department of Defense and other government agencies.

Figure 12:
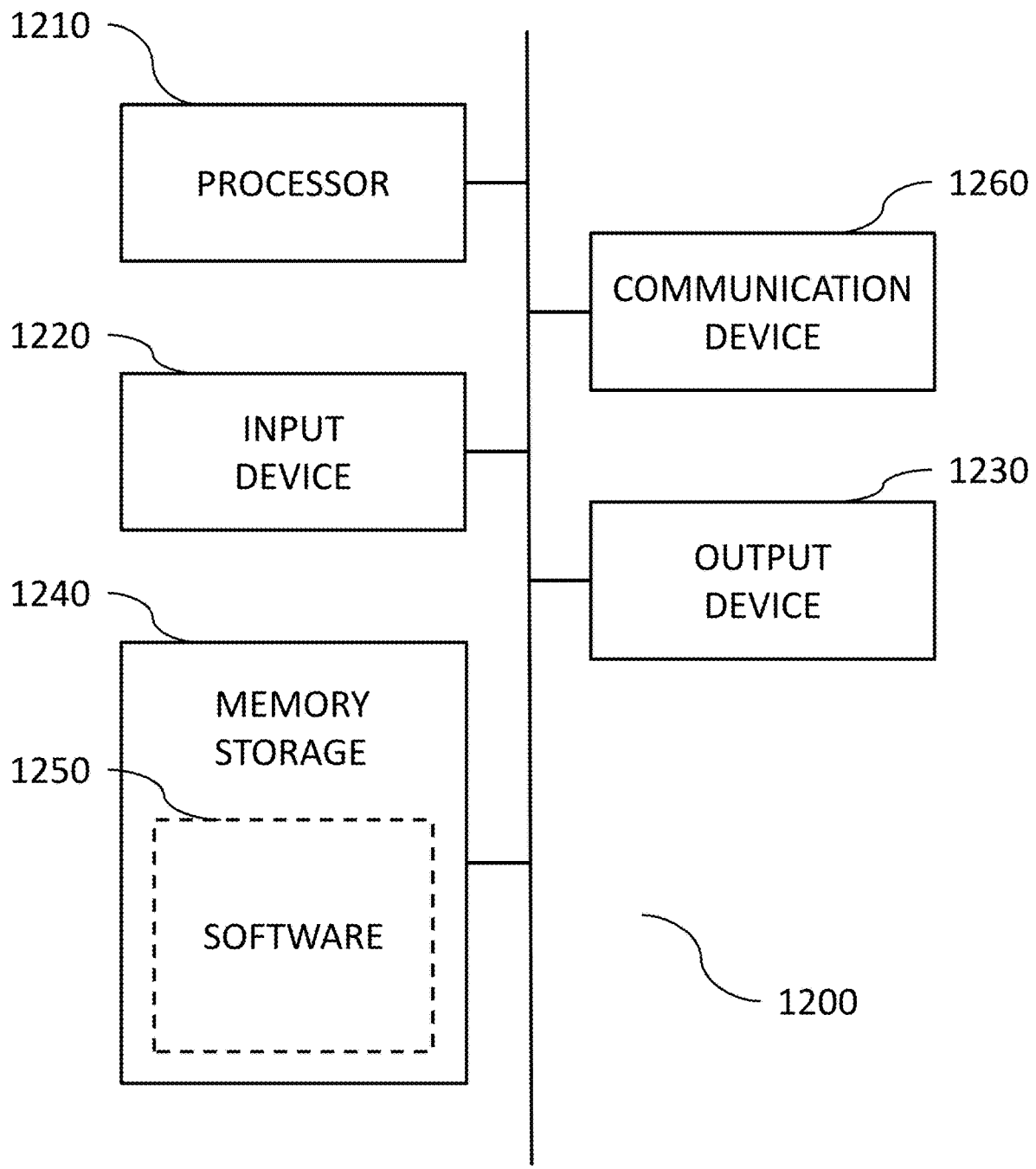
FIG. 12 provides a non-limiting schematic illustration of a computing system in accordance with one or more examples of the present disclosure.

Computer Processors, Devices, and Systems:

FIG. 12 illustrates an example of a computing device in accordance with one or more examples of the disclosure. Device 1200 can be a host computer connected to a network. Device 1200 can be a client computer or a server. As shown in FIG. 12, device 1200 can be any suitable type of microprocessor-based device, such as a personal computer, workstation, server, or handheld computing device (portable electronic device), such as a phone or tablet. The device can include, for example, one or more of processor 1210, input device 1220, output device 1230, storage 1240, and communication device 1260. Input device 1220 and output device 1230 can generally correspond to those described above, and they can either be connectable or integrated with the computer.

Input device 1220 can be any suitable device that provides input, such as a touch screen, keyboard or keypad, mouse, or voice-recognition device. Output device 1230 can be any suitable device that provides output, such as a touch screen, haptics device, or speaker.

Storage 1240 can be any suitable device that provides storage, such as an electrical, magnetic, or optical memory including a RAM, cache, hard drive, or removable storage disk. Communication device 1260 can include any suitable device capable of transmitting and receiving signals over a network, such as a network interface chip or device. The components of the computer can be connected in any suitable manner, such as via a physical bus or wirelessly.

Software 1250, which can be stored in memory/storage 1240 and executed by processor 1210, can include, for example, the programming that embodies the functionality of the present disclosure (e.g., as embodied in the devices described above).

Software 1250 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1240, that can contain or store programming for use by or in connection with an instruction execution system, apparatus, or device.

Software 1250 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 1200 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 1200 can implement any operating system suitable for operating on the network. Software 1250 can be written in any suitable programming language, such as C, C++, Java, or Python. In various embodiments, application software embodying the functionality of the present disclosure can be deployed in different configurations, such as in a client/server arrangement or through a web browser as a web-based application or web service, for example.

EXAMPLES

Example 1—Gaps and Overlaps Analysis

In one non-limiting example of a use case, the disclosed methods and systems may be used for "gaps and overlaps" analysis, e.g., a user may load electronic requirements documents or other engineering documents for two different projects. Following the selection of a unique ID for a given requirement and the corresponding requirements data for the first project, the system processes the information and evaluates the requirements documents for the second project to identify those that are correlated with the selected requirement and lists differences or overlaps in project requirements.

This capability may be used for a variety of different applications, e.g., performing "gaps and overlaps" analysis for government programs. For example, one may compare the requirements for a first program, e.g., the Army Training Information System (ATIS) program, and a second program, e.g., the Training Simulation Software (TSS) program, to identify if there are gaps or overlaps in the requirements of the two programs. A user of the RAAM system selects from a listing of requirements documents for the ATIS program and the system processes the corresponding documents for the TSS program to highlight those that include corresponding requirements, thereby eliminating the need for manual review and/or keyword searching.

Example 2—Program of Record Analysis

As another non-limiting example of a use case, the disclosed methods and systems can also be used for "program of record" analysis. There is growing pressure to merge the engineering documents for a number of legacy government programs into an updated set of documents that reflect current program objectives. This typically requires laborious manual review of all requirement documents for the legacy programs, and a comprehensive merge of the relevant requirement information extracted therefrom without inadvertently dropping any critical information. The disclosed methods and systems provide the capability to upload requirements documents from a plurality of legacy programs and process them to quickly and efficiently generate a single, comprehensive, and updated requirements document that complies with INCOSE and/or IEEE requirements standards.

Example 3—RAAM Traceability Tool

This non-limiting example provides a more detailed description of the RAAM Traceability tool. Requirements traceability in systems engineering refers to the ability to document and trace a requirement in both a forward direction (i.e., from its original source through its development and specification, to its subsequent implementation in a developed system or software package) and backwards direction (i.e., through periods of refinement and iteration in any phase of a systems engineering project). The goal of requirements traceability is to understand how high-level requirements (e.g., market or application requirements, system functionality and performance requirements, cost requirements, development timeline objectives, etc.) are transformed into lower-level requirements (e.g., specific design requirements, testing requirements, etc.), and is therefore concerned with identifying and ensuring that relationships between different layers of information (e.g., engineering artifacts) are satisfied. Traceability may thus require documentation of relationships between many kinds of development artifacts, e.g., system or software requirements, specification statements, designs, models and prototypes, testing protocols and test data, developed system or software components, etc.

The RAAM Traceability tool provides the user with the functionality to accurately trace and document requirements for complex systems engineering projects. Examples of the capabilities provided by the RAAM Traceability tool include extracting requirements from Excel spreadsheets into a digitized serialized format, automated matching of similar-meaning requirements based on NLP-based document similarity analysis, generation of linking tables or merged files, and creation, population, and usage of domain models.

The RAAM Traceability tool's requirement extraction and serialization capability includes, for example, detection of faulty universal unique identification numbers (UUIDs), detection of incorrectly formatted hierarchy values (ex. 1-2 instead of 1.2), and detection of faulty description columns The tool also iteratively links parent to its children and vice versa for requirements within a hierarchical document. Detection of duplicate UUIDs or faulty hierarchy values are flagged for the user and a failed traceability alert is issued.

The RAAM Traceability tool's requirements matching capability is based on, for example, the use of natural language processing (NLP) algorithms and trained machine learning models. In some instances, requirements matching may be performed using: (i) a pre-trained baseline BERT model that has been trained on a general corpus (e.g., the Wikipedia corpus) using a Siamese-type network specialized for sentence similarity (see, e.g., Reimers, et al. (2019), "Sentence-BERT: Sentence Embedding Using Siamese BERT-Networks", arXiv: 1908. 10084v1), (ii) a basic TF-IDF "bag-of-words" approach, (iii) Latent Dirichlet Allocation (LDA)—an unsupervised topic modeling algorithm, or any combination thereof.

The RAAM tool utilizes several novel strategies to improve requirements matching results, including acronym expansion for acronyms used in specialized domains (e.g., the Department of Defense (DoD), Army, and other government domains) using a pre-defined and/or user-defined acronym glossary; automatic detection of stop words (e.g., words that appear in >50% of requirements documents); and consolidation of the results obtained using multiple matching algorithms/models, e.g., with average score scaling and optional preferences. Hierarchy considerations (e.g., merging unique words from parent, grandparents, and children into a requirement before performing requirements matching based on term frequency) and "maximum number of words" limitations (e.g., maximum word limits on concatenations) may also be used to improve the requirements matching results. In some instances, machine learning models (e.g., a BERT model) may be fine-tuned on specialized requirements document training sets (e.g., DoD, Army, or other government requirement documents training sets) to enable specialization for a specific domain. In some instances, prediction of out-of-vocabulary (OOV) words using, e.g., a BERT model may provide an alternative to acronym expansion with possible improvement in requirements matching results.

Other unique capabilities of the RAAM Traceability tool include the general capability to take two sets of requirements documents, run pre-processing (e.g., cleaning, normalization, removing stop words, expanding acronyms, etc.), then perform matching (using, e.g., BERT and/or TF-IDF and/or LDA), run post-processing (e.g., perform similarity consolidation), to find the most similar requirements from one set to each requirement from another set. The result of this algorithm is a dictionary that maps requirements to its best matches, which are listed in decreasing order of similarity.

The RAAM Traceability tool's capabilities for serialization of requirements matching job results are based on, for example, the use of express session tokens that allow the "caching" of requirements matching data on the client side, thereby allowing for quick and easy access to a user's current requirements matching job data and avoiding having to call the host database with every action. Other features include automatic saving of session progress, and the separate saving of files that can also optionally be saved locally—which is useful when a user wants to download their files, or during the export file creation process.

The RAAM's Traceability tool supports an advanced graphical user interface allowing users to review and approve of the RAAM's found matches. As natural language processing-based methods for evaluating document similarity and establishing linkages are not sufficiently accurate, it is the responsibility of the engineer to establish links between requirements. The GUI for traceability lets the user quickly review the best potential matches for any given requirement, and select the matches they deem to be accurate, creating a "link" between those requirements. Ultimately, the user is expected to aim to review matches for all requirements in a file and trace to as many related requirements as possible.

The RAAM Traceability tool's exported linking tables or merged files automatically consolidate all of a user's selections (linkages) described previously into one of several documents. The merged file preserves the original backbone file's rows when the file is generated, and only merges linked requirements from the compared file underneath one backbone requirement as its hierarchical "child", thereby creating a dependency, and updates their hierarchy values. These assigned hierarchy values are based on the hierarchy value of the parent if it exists. If it does not exist, the RAAM will automatically assign a default hierarchy value to both the parent and child. If families of compare requirements were merged, the merged requirements file will preserve their hierarchical relationship. The merged requirements file also provides color coding of merged requirements to distinguish which children were from the original backbone document versus from the compare document.

The linking table created by the RAAM Traceability tool may be output in any of a variety of formats known to those of skill in the art. For example, a standard linking table format generates a matrix that links one backbone requirement to one compare requirement and shows the source file, UUID, hierarchy, and description values for both. The table may be color coded by compare file. The DOORS single-file format generates a file containing backbone requirement UUID and description columns, with additional "linking columns" (1 per compare file) with a comma-separated list of UUIDs of compare files linked to their respective backbone requirement. The DOORS multi-file format is the same as the single-file format, but multiple files are returned (1 per compare file) containing a single linking column for each. All DOORS export files are carefully formatted to be compatible with ingestion into IBM DOORS.

The RAAM Traceability tool includes a dedicated graphical user interface (GUI) that allows users to create and manage multiple "domain models", i.e., machine learning models which contain definitions for domain-specific acronyms and vocabulary, as well as manually-defined relationships between specific vocabulary. When uploading requirements documents, the system automatically scans for and saves acronyms and vocabulary not yet found within the user's chosen domain model. These found terms can be saved to the user's domain model for subsequent definition. When evaluating document similarity between two requirements texts, the system utilizes the user's chosen domain model to more accurately determine the level of similarity.

Example 4—Master Traceability Schema

Table 1 provides a non-limiting example of a master traceability schema which serves as the proper formatting template for any file uploaded to the RAAM, and the layout of the information compiled therein. This example illustrates the layout of traceability analysis results for two sets of documents, e.g., government documents comprising Technical Support Services—Task Management Tool—System Requirement Documents (TSS—TMT—SRD) and Capability Development Documents—System Requirement Documents (CDD—SRD).

TABLE 1

| Exemplary Master Traceability Schema | | | |
|---|---|---|---|
| UUID | HID | (Other Fields) | Requirement |
| 1 | 1.1 | ... | Lorem ipsum dolor sit amet, consectetur adipiscing ... |
| 2 | 1.1.1 | ... | Lorem ipsum dolor sit amet, consectetur adipiscing ... |
| 3 | 1.1.2 | ... | Lorem ipsum dolor sit amet, consectetur adipiscing ... |
| 4 | 1.2 | ... | Lorem ipsum dolor sit amet, consectetur adipiscing ... |

The highlighted column labels above denote essential metadata for any requirements Excel file formatted properly for RAAM ingestion. Note that only two are required—the requirement's universally unique identifier (UUID) and requirements text. UUIDs must be unique across all requirements within their worksheet. Also note the hierarchy identifier (HID) column is an optional specification, as it may or may not be relevant to a user's system.

The traceability schema should be presented in a horizontal layout, e.g., in an Excel spreadsheet format with different types of information entered in different columns, and different entries for each type entered in different rows, such that sorting of the requirements traceability data may be performed. Furthermore, in some instances the schema may include additional entries not necessary for ingestion into the RAAM tool depending on the specific project. These extraneous columns will not affect the ability of the RAAM to ingest the files.

Example 5—RAAM Requirements Quality Analysis Tool

This non-limiting example provide a more detailed description of the RAAM Quality Analysis tool. As noted above, the disclosed methods and systems provide users with the functionality to accurately trace and document requirements for complex systems engineering projects while conforming to professionally-recognized standards for engineering requirements documents, e.g., the International Council on Systems Engineering (INCOSE) standard and/or the Institute of Electrical and Electronics Engineers (IEEE) standard. The requirement extraction and serialization capability provided in RAAM provides for detection of faulty UUIDs, hierarchy, and description columns based on an "invalid count" counter. The RAAM Traceability tool also iteratively sets links to parent and children for requirements within a hierarchical document, and provides detection of duplicate UUIDs or hierarchy values.

The RAAM Quality Analysis tool's requirement quality analysis algorithms include pattern matching using common/regular expressions to detect certain word formations within requirement descriptions that indicate the presence of a violation of an INCOSE or IEEE rule. Furthermore, custom corpuses of words and phrases that violate individual INCOSE or IEEE rules are also compared against requirement descriptions. The presence of any of these words or phrases indicates a rule violation as well. The tool also provides customized checks of requirement document metadata, which can also indicate a rule violation.

The RAAM Quality Analysis tool utilizes several novel strategies to improve requirements quality analysis. For example, the aforementioned custom corpuses of words and common/regular expressions have been incorporated into custom Python routines which are iteratively run against all uploaded requirement descriptions. A color gradient is then used to indicate requirements that fail to conform to quantity standards and the number of quality rules that a given requirement description breaks. The tool provides the ability to view specific instances of a rule being broken if multiple instances, exist. The tool also provides the capability to ignore or "turn off" certain rules (either permanently or until they are turned back on) based on the needs of the user.

Additional features of the RAAM Requirements Quality Analysis tool include a visual helper tool to suggest fixes to requirement descriptions that break certain quality rules, and inclusion of traceability meta-data that allows users to track the changes they make to certain documents over time. The tool also provides the ability to insert new requirements during an analysis session, e.g., either to accommodate a broken rule or at the user's discretion. A constant saved progress feature ensures that minimal data is lost when the page is reloaded.

Output requirements documents are nearly identical to those input, thereby allowing users to quickly utilize the improvements the RAAM Requirements Quality Analysis tool brings to improving requirements quality. The tool also enables the optional creation of a summarized view of the results of the requirements quality analysis. This summarized output facilitates easy processing of the visual indicators of requirements that failed to pass quality standards, and indicates which rule was violated and where the instances of violation occurred. It is also useful for batch processing of files or for later offline review.

It should be understood from the foregoing that, while particular implementations of the disclosed methods and systems have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A computer-implemented method for automated analysis of engineering requirements comprising:
    displaying, within a first region of a graphical user interface on an electronic display device, a first list of one or more engineering requirement documents, wherein the one or more engineering requirement documents comprise one or more domain-specific acronyms;
    displaying, within a second region of the graphical user interface on the electronic display device, a second list of one or more engineering documents uploaded by the user;
    receiving, using one or more processors, a first input from the user indicating a selection of one or more engineering requirement documents from the first list;
    pre-processing, using a first machine learning model trained to convert domain-specific acronyms to natural language, the one or more selected engineering requirement documents from the first list to convert the one or more domain-specific acronyms into words:
    processing the one or more pre-processed engineering requirement documents using one or more artificial intelligence (AI)-based natural language processing models to identify one or more key terms;
    processing the one or more engineering documents of the second list using the one or more AI-based natural language processing models to identify text corresponding to the one or more key terms, wherein words of the one or more engineering documents of the second list and a mask comprising the one or more key terms are input to a transformer encoder of the one or more AI-based natural language processing models and an output of the transformer encoder is processed by a classification layer of the one or more AI-based natural language processing models that outputs the text corresponding to the one or more key terms; and
    indicating, in the display of the second list of the one or more engineering documents within the second region of the graphical user interface, those engineering documents of the second list that include the text corresponding to the one or more key terms.

2. The computer-implemented method of claim 1, further comprising determining, using the one or more AI-based natural language processing models, a relationship between the one or more engineering requirement documents selected from the first list and those engineering documents of the second list that include the text corresponding to the one or more key terms.

3. The computer-implemented method of claim 2, wherein the relationship comprises a priority, a dependency, a causal constraint, a resource constraint, or a discretionary constraint.

4. The computer-implemented method of claim 1, further comprising using a graphical indicator to indicate the one or more engineering requirement documents selected from the first list in the first region of the graphical user interface.

5. The computer-implemented method of claim 4, wherein the graphical indicator comprises highlighting the one or more selected engineering requirement documents.

6. The computer-implemented method of claim 1, further comprising using a graphical indicator to indicate those engineering documents of the second list that include the text corresponding to the one or more key terms in the second region of the graphical user interface.

7. The computer-implemented method of claim 6, wherein the graphical indicator comprises highlighting those engineering documents of the second list that include the text corresponding to the one or more key terms.

8. The computer-implemented method of claim 6, wherein the graphical indicator is different depending on a relationship between the one or more engineering requirement documents of the first list and those engineering documents of the second list that include the text corresponding to the one or more key terms.

9. The computer-implemented method of claim 1, wherein the one or more engineering documents of the second list comprise system or software requirement documents, system or software specification documents, system or software design documents, system or software architecture documents, system or software research requirements, system or software data model documents, system or software risk factor documents, system or software test case documents, system or software quality requirements, or any combination thereof.

10. The computer-implemented method of claim 1, wherein the graphical user interface is configured to allow the user to exchange documents and data with a commercial systems engineering software package.

11. The computer-implemented method of claim 1, further comprising outputting an updated engineering requirements document that summarizes text extracted from those engineering documents of the second list that include the text corresponding to the one or more key terms.

12. The computer-implemented method of claim 11, wherein the updated engineering requirements document complies with a professionally-recognized standard for engineering requirements documents.

13. The computer-implemented method of claim 1, wherein the one or more AI-based natural language processing models comprise a Support Vector Machine (SVM) algorithm, a Bayesian Network algorithm, a Maximum Entropy algorithm, a Conditional Random Field algorithm, a Neural Network or Deep Learning algorithm, a Bidirectional Encoder Representations from Transformers (BERT) algorithm, a Term Frequency-Inverse Document Frequency (TF-IDF) algorithm, or any combination thereof.

14. The computer-implemented method of claim 1, wherein the one or more AI-based natural language processing models have been trained on a training data set comprising domain-specific vocabulary words and acronyms.

15. The computer-implemented method of claim 1, wherein the graphical user interface comprises at least a third region configured to allow the user to enter and define domain-specific vocabulary words and acronyms, and wherein the user-entered and defined domain-specific vocabulary words and acronyms are used to update a training data set used to train the one or more AI-based natural language processing models.

16. A computer-implemented method for automated analysis of engineering requirements comprising:
   receiving a first set of one or more engineering requirement documents, wherein the one or more engineering requirement documents comprise one or more domain-specific acronyms;
   receiving a second set of one or more engineering documents;
   receiving a first input from a user indicating a selection of one or more engineering requirement documents from the first set;
   pre-processing, using a first machine learning model trained to convert domain-specific acronyms to natural language, the one or more selected engineering requirement documents from the first set to convert the one or more domain-specific acronyms into words;
   processing the one or more pre-processed engineering requirement documents using one or more processors configured to run one or more artificial intelligence (AI)-based natural language processing models to identify one or more key terms;
   processing the one or more engineering documents of the second set using the one or more AI-based natural language processing models to identify text corresponding to the one or more key terms, wherein words of the one or more engineering documents of the second set and a mask comprising the one or more key terms are input to a transformer encoder of the one or more AI-based natural language processing models and an output of the transformer encoder is processed by a classification layer of the one or more AI-based natural language processing models that outputs the text corresponding to the one or more key terms;
   identifying those engineering documents of the second set that include the text corresponding to the one or more key terms; and
   determining, using the one or more AI-based natural language processing models, a relationship between the one or more engineering requirement documents selected from the first set and those engineering documents of the second set that include the text corresponding to the one or more key terms.

17. The computer-implemented method of claim 16, wherein the relationship comprises a priority, a dependency, a causal constraint, a resource constraint, or a discretionary constraint.

18. The computer-implemented method of claim 16, wherein the one or more engineering documents of the second list comprise system or software requirement documents, system or software specification documents, system or software design documents, system or software architecture documents, system or software research requirements, system or software data model documents, system or software risk factor documents, system or software test case documents, system or software quality requirements, or any combination thereof.

19. The computer-implemented method of claim 16, further comprising outputting an updated engineering requirements document that summarizes text extracted from those engineering documents of the second list that include the text corresponding to the one or more key terms.

20. The computer-implemented method of claim 19, wherein the updated engineering requirements document complies with a professionally-recognized standard for engineering requirement documents.

21. The computer-implemented method of claim 16, wherein the one or more AI-based natural language processing-algorithms models comprise a Support Vector Machine (SVM) algorithm, a Bayesian Network algorithm, a Maximum Entropy algorithm, a Conditional Random Field algorithm, a Neural Network or Deep Learning algorithm, a Bidirectional Encoder Representations from Transformers (BERT) algorithm, a Term Frequency-Inverse Document Frequency (TF-IDF) algorithm, or any combination thereof.

22. The computer-implemented method of claim 16, wherein the one or more AI-based natural language processing models have been trained on a training data set comprising domain-specific vocabulary words and acronyms.

23. The computer-implemented method of claim 16, wherein the computer-implemented method is packaged as a containerized web application.

24. A system for performing automated analysis of engineering requirements comprising:
  a display;
  one or more input devices;
  one or more processors; and
  a memory device comprising a set of stored instructions which, when executed by the one or more processors, cause the system to:
    receive a first set of one or more engineering requirement documents, wherein the one or more engineering requirement documents comprise one or more domain-specific acronyms;
    receive a second set of one or more engineering documents;
    receive a first input from a user indicating a selection of one or more engineering requirement documents from the first set;
    pre-process, using a first machine learning model trained to convert domain-specific acronyms to natural language, the one or more selected engineering requirement documents from the first set to convert the one or more domain-specific acronyms into words;
    process the one or more pre-processed engineering requirement documents using one or more processors configured to run one or more artificial intelligence (AI)-based natural language processing models to identify one or more key terms;
    process the one or more engineering documents of the second set using the one or more AI-based natural language processing models to identify text corresponding to the one or more key terms, wherein words of the one or more engineering documents of the second set and a mask comprising the one or more key terms are input to a transformer encoder of the one or more AI-based natural language processing models and an output of the transformer encoder is processed by a classification layer of the one or more AI-based natural language processing models that outputs the text corresponding to the one or more key terms;
    identify those engineering documents of the second set that include the text corresponding to the one or more key terms; and
    determine, using the one or more AI-based natural language processing models, a relationship between the one or more engineering requirement documents selected from the first set and those engineering documents of the second set that include the text corresponding to the one or more key terms.

25. A non-transitory computer-readable storage medium storing one or more programs, the one or more programs comprising instructions which, when executed by one or more processors of an electronic device or system, cause the electronic device or system to:
  receive a first set of one or more engineering requirement documents, wherein the one or more engineering requirement documents comprise one or more domain-specific acronyms;
  receive a second set of one or more engineering documents;
  receive a first input from a user indicating a selection of one or more engineering requirement documents from the first set;
  pre-process, using a first machine learning model trained to convert domain-specific acronyms to natural language, the one or more selected engineering requirement documents from the first set to convert the one or more domain-specific acronyms into words;
  process the one or more pre-processed engineering requirement documents using one or more processors configured to run one or more artificial intelligence (AI)-based natural language processing models to identify one or more key terms;
  process the one or more engineering documents of the second set using the one or more AI-based natural language processing models to identify text corresponding to the one or more key terms, wherein words of the one or more engineering documents of the second set and a mask comprising the one or more key terms are input to a transformer encoder of the one or more AI-based natural language processing models and an output of the transformer encoder is processed by a classification layer of the one or more AI-based natural language processing models that outputs the text corresponding to the one or more key terms;
  identify those engineering documents of the second set that include the text corresponding to the one or more key terms; and
  determine, using the one or more AI-based natural language processing models, a relationship between the one or more engineering requirement documents selected from the first set and those engineering documents of the second set that include the text corresponding to the one or more key terms.

* * * * *